(12) United States Patent
Yamamoto et al.

(10) Patent No.: US 6,721,106 B2
(45) Date of Patent: Apr. 13, 2004

(54) TAKING LENS DEVICE

(75) Inventors: Yasushi Yamamoto, Kishiwada (JP); Hitoshi Hagimori, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 80 days.

(21) Appl. No.: 09/821,532

(22) Filed: Mar. 28, 2001

(65) Prior Publication Data

US 2001/0038496 A1 Nov. 8, 2001

(30) Foreign Application Priority Data

Mar. 29, 2000 (JP) ........................................ 2000-095247
Dec. 4, 2000 (JP) ........................................ 2000-368343

(51) Int. Cl.$^7$ .............................................. G02B 15/14
(52) U.S. Cl. ........................ 359/689; 359/684; 359/680; 359/686; 359/682
(58) Field of Search ................................. 359/686, 687, 359/688, 683, 684, 689, 676, 680, 681, 682, 770, 771, 781

(56) References Cited

U.S. PATENT DOCUMENTS

| 4,696,553 | A | * | 9/1987 | Tsuji et al. | 350/427 |
|---|---|---|---|---|---|
| 5,253,113 | A | * | 10/1993 | Sekita et al. | 359/680 |
| 5,264,965 | A | * | 11/1993 | Hirakawa | 359/686 |
| 5,515,204 | A | * | 5/1996 | Usui et al. | 359/684 |
| 5,715,098 | A | * | 2/1998 | Kim | 359/748 |
| 5,764,420 | A | * | 6/1998 | Yahagi | 359/682 |
| 5,999,329 | A | * | 12/1999 | Ohtake | 359/686 |
| 6,002,529 | A | * | 12/1999 | Kohno | 359/686 |
| 6,185,048 | B1 | * | 2/2001 | Ishii et al. | 359/687 |
| 6,215,599 | B1 | * | 4/2001 | Ohtake | 359/688 |
| 6,266,195 | B1 | * | 7/2001 | Shinohara | 359/686 |
| 6,285,501 | B1 | * | 9/2001 | Suzuki | 359/554 |
| 6,426,841 | B1 | * | 7/2002 | Araki et al. | 359/834 |
| 2002/0005294 | A1 | * | 5/2002 | Ejima et al. | 345/792 |

* cited by examiner

Primary Examiner—Jordan M. Schwartz
Assistant Examiner—Timothy J Thompson
(74) Attorney, Agent, or Firm—Sidley Austin Brown & Wood LLP

(57) ABSTRACT

A optical device has a zoom lens system that is comprised of a plurality of lens units and that achieves zooming by varying unit-to-unit distances and an image sensor that converts an optical image formed by the zoom lens system into an electrical signal. The zoom lens system is comprised of, from the object side, a first lens unit having a negative optical power, a second lens unit having a negative optical power, a third lens unit having a positive optical power, and a fourth lens unit having a positive optical power. The zoom lens system achieves zooming by varying the distances between the first to fourth lens units.

20 Claims, 14 Drawing Sheets

FNO=2.84

W
—— d
—·— g
—··— c
----- SC
-0.1   0.1
SPHERICAL ABERRATION
SINE CONDITION

Y'=3.3

----- DM
—— DS
-0.1   0.1
ASTIGMATISM

Y'=3.3

-5.0   5.0
DISTORTION %

FNO=2.84

M
—— d
—·— g
—··— c
----- SC
-0.1   0.1
SPHERICAL ABERRATION
SINE CONDITION

Y'=3.3

----- DM
—— DS
-0.1   0.1
ASTIGMATISM

Y'=3.3

-5.0   5.0
DISTORTION %

FNO=2.90

T
—— d
—·— g
—··— c
----- SC
-0.1   0.1
SPHERICAL ABERRATION
SINE CONDITION

Y'=3.3

----- DM
—— DS
-0.1   0.1
ASTIGMATISM

Y'=3.3

-5.0   5.0
DISTORTION %

FNO=2.67
(W)
— d
—·— g
----- SC
-0.1  0.1
SPHERICAL ABERRATION
SINE CONDITION

Y'=3.3
----- DM
——— DS
-0.1  0.1
ASTIGMATISM

Y'=3.3
-5.0  5.0
DISTORTION %

FNO=2.90
(M)
— d
—·— g
----- SC
-0.1  0.1
SPHERICAL ABERRATION
SINE CONDITION

Y'=3.3
----- DM
——— DS
-0.1  0.1
ASTIGMATISM

Y'=3.3
-5.0  5.0
DISTORTION %

FNO=2.90
(T)
— d
—·— g
----- SC
-0.1  0.1
SPHERICAL ABERRATION
SINE CONDITION

Y'=3.3
----- DM
——— DS
-0.1  0.1
ASTIGMATISM

Y'=3.3
-5.0  5.0
DISTORTION %

FNO=2.70

W
— d
-·-·- g
----- SC

-0.1  0.1
SPHERICAL ABERRATION
SINE CONDITION

Y'=3.3

----- DM
——— DS

-0.1  0.1
ASTIGMATISM

Y'=3.3

-5.0  5.0
DISTORTION %

FNO=2.84

M
— d
-·-·- g
----- SC

-0.1  0.1
SPHERICAL ABERRATION
SINE CONDITION

Y'=3.3

----- DM
——— DS

-0.1  0.1
ASTIGMATISM

Y'=3.3

-5.0  5.0
DISTORTION %

FNO=2.89

T
— d
-·-·- g
----- SC

-0.1  0.1
SPHERICAL ABERRATION
SINE CONDITION

Y'=3.3

----- DM
——— DS

-0.1  0.1
ASTIGMATISM

Y'=3.3

-5.0  5.0
DISTORTION %

FNO=2.44
W

SPHERICAL ABERRATION
SINE CONDITION

Y'=1.2

ASTIGMATISM

Y'=1.2

DISTORTION %

FNO=3.37
M

SPHERICAL ABERRATION
SINE CONDITION

Y'=1.2

ASTIGMATISM

Y'=1.2

DISTORTION %

FNO=4.10
T

SPHERICAL ABERRATION
SINE CONDITION

Y'=1.2

ASTIGMATISM

Y'=1.2

DISTORTION %

TAKING LENS DEVICE

This application is based on Japanese Patent Applications Nos. 2000-95247 and 2000-368343, filed on Mar. 29, 2000 and Dec. 4, 2000, respectively, the contents of which are hereby incorporated by reference.

BACKGROUND OF THE INVENTION

1. Field of the Invention

The present invention relates to an optical device, or a taking lens device. More specifically, the present invention relates to a taking lens device that optically takes in an image of a subject through an optical system and that then outputs the image as an electrical signal, for example, a taking lens device that is used as a main component of a digital still camera, a digital video camera, or a camera that is incorporated in or externally fitted to a device such as a digital video unit, a personal computer, a mobile computer, a portable telephone, or a personal digital assistant (PDA). The present invention relates particularly to a taking lens device which is provided with a compact, high-zoom-ratio zoom lens system.

2. Description of Prior Art

In recent years, as personal computers and other data processing devices have become more and more popular, digital still cameras, digital video cameras, and the like (hereinafter collectively referred to as digital cameras) have been coming into increasingly wide use. Personal users are using these digital cameras as handy devices that permit easy acquisition of image data to be fed to digital devices. As image data input devices, digital cameras are expected to continue gaining popularity.

In general, the image quality of a digital camera depends on the number of pixels in the solid-state image sensor, such as a CCD (charge-coupled device), which is incorporated therein. Nowadays, many digital cameras which are designed for general consumers, boast of high resolution of over a million pixels, and are thus approaching silver-halide film cameras in image quality. On the other hand, even in digital cameras designed for general consumers, zoom capability (especially optical zoom capability with minimal image degradation) is desired, and therefore, in recent years, there has been an increasing demand for zoom lenses for digital cameras that offer both a high zoom ratio and high image quality.

However, conventional zoom lenses for digital cameras that offer high image quality of over a million pixels are usually built as relatively large lens systems. One way to avoid this inconvenience is to use, as zoom lenses for digital cameras, zoom lenses which were originally designed for lens-shutter cameras in which remarkable miniaturization and zoom ratio enhancement have been achieved in recent years. However, if a zoom lens designed for a lens-shutter camera is used unchanged in a digital camera, it is not possible to make good use of the light-condensing ability of the microlenses disposed on the front surface of the solid-state image sensor. This causes severe unevenness in brightness between a central portion and a peripheral portion of the captured image. The reason is that in a lens-shutter camera, the exit pupil of the taking lens system is located near the image plane, and therefore off-axial rays exiting from the taking lens system strike the image plane from oblique directions. This can be avoided by locating the exit pupil away from the image plane, but not without making the taking lens system larger.

SUMMARY OF THE INVENTION

An object of the present invention is to provide an optical, or a taking lens device, which is provided with a novel zoom lens system that, despite being compact, offers both a high zoom ratio and high image quality.

To achieve this object, according to one aspect of the present invention, an optical, or taking lens device is provided with: a zoom lens system that is comprised of a plurality of lens units which achieves zooming by varying the unit-to-unit distances; and an image sensor that converts an optical image formed by the zoom lens system into an electrical signal. The zoom lens system comprises at least, from the object side thereof to an image side thereof, a first lens unit having a negative optical power, a second lens unit having a negative optical power, a third lens unit having a positive optical power, and a fourth lens unit having a positive optical power. The zoom lens system achieves zooming by varying the distances between the first to fourth lens units.

According to another aspect of the present invention, an optical, or taking lens device is provided with: a zoom lens system that is comprised of a plurality of lens units which achieves zooming by varying the unit-to-unit distances; and an image sensor that converts an optical image formed by the zoom lens system into an electrical signal. The zoom lens system is comprised of, at least from the object side, a first lens unit having a negative optical power, a second lens unit having a negative optical power, and a third lens unit having a positive optical power. The first lens unit comprises a single lens element.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
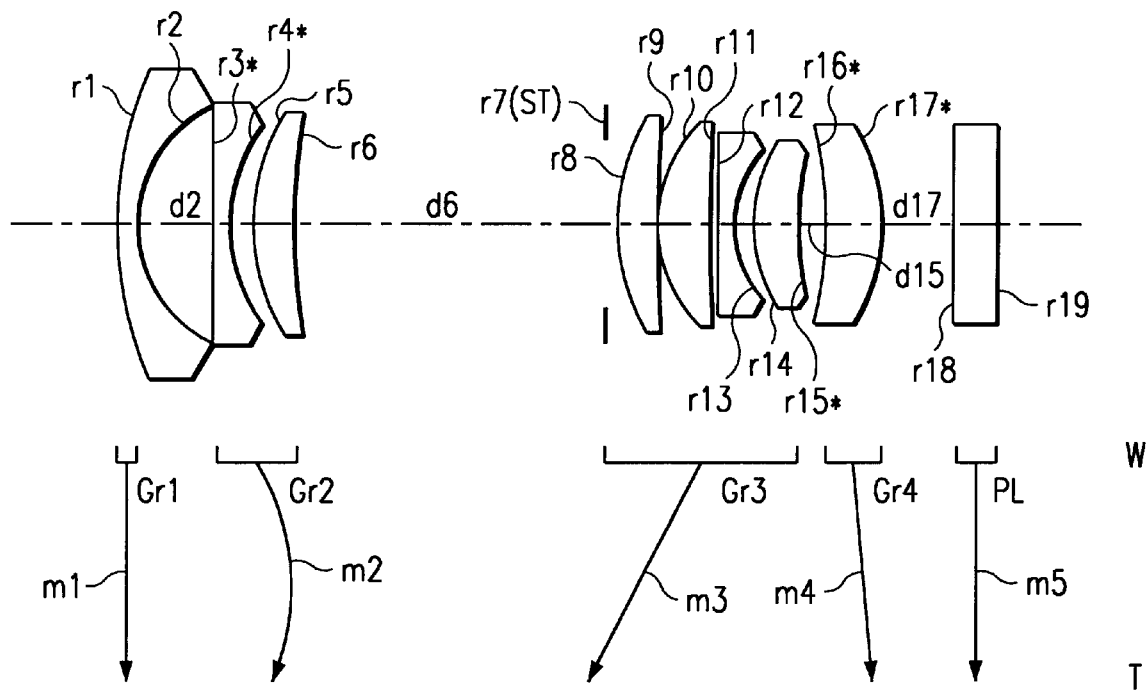
FIG. 1 is a lens arrangement diagram of a first embodiment (Example 1) of the invention.
Figure 2:
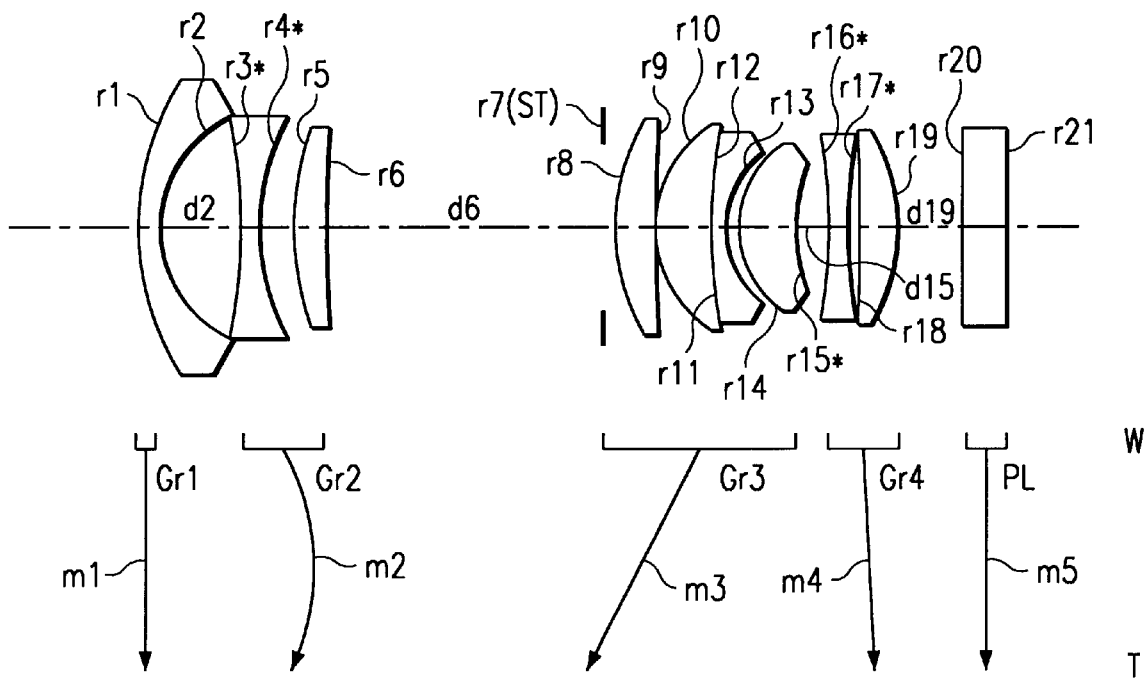
FIG. 2 is a lens arrangement diagram of a second embodiment (Example 2) of the invention.
Figure 3:
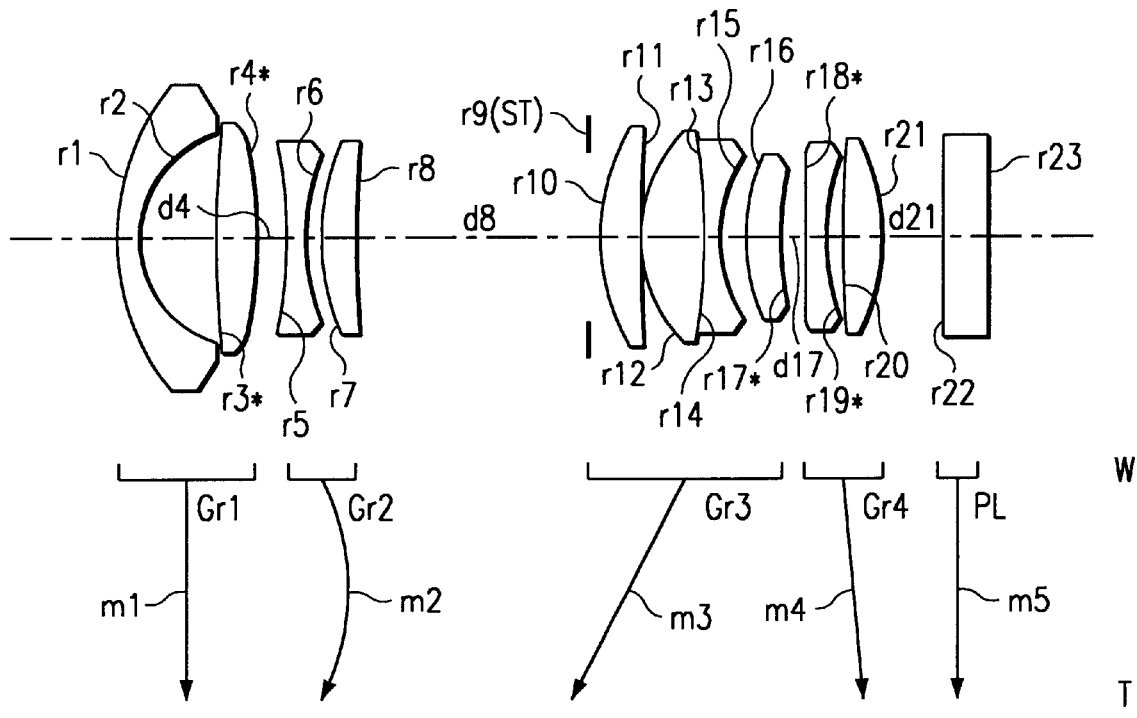
FIG. 3 is a lens arrangement diagram of a third embodiment (Example 3) of the invention.
Figure 4:
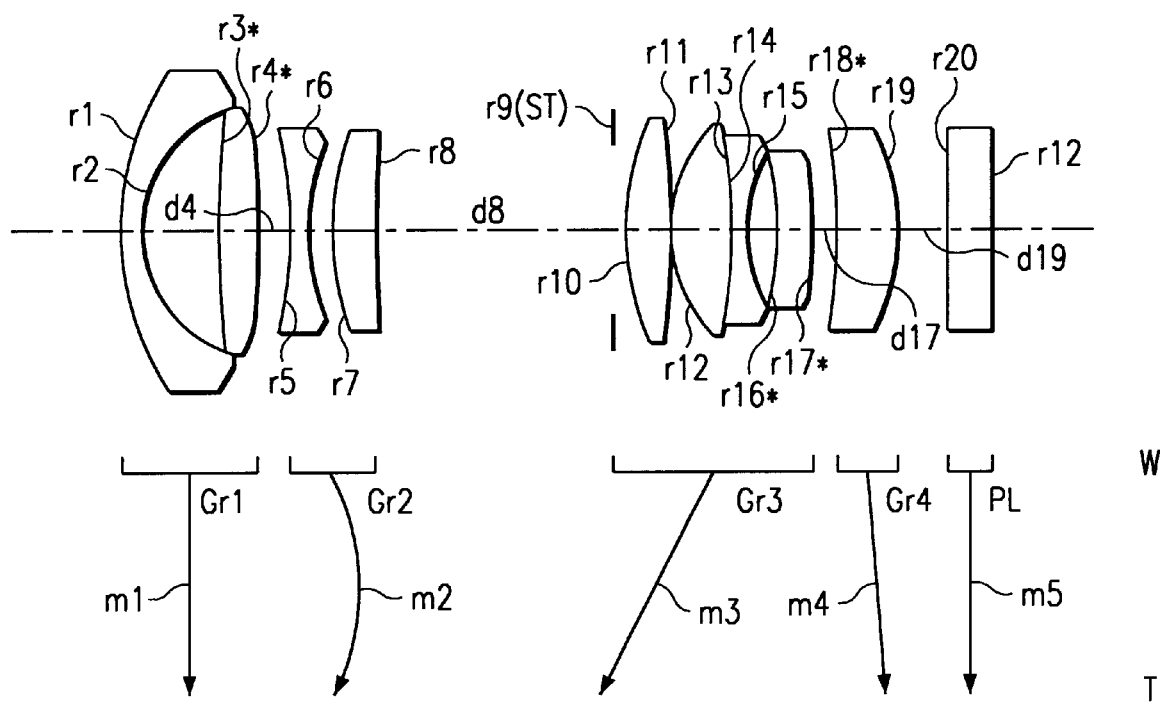
FIG. 4 is a lens arrangement diagram of a fourth embodiment (Example 4) of the invention.
Figure 5:
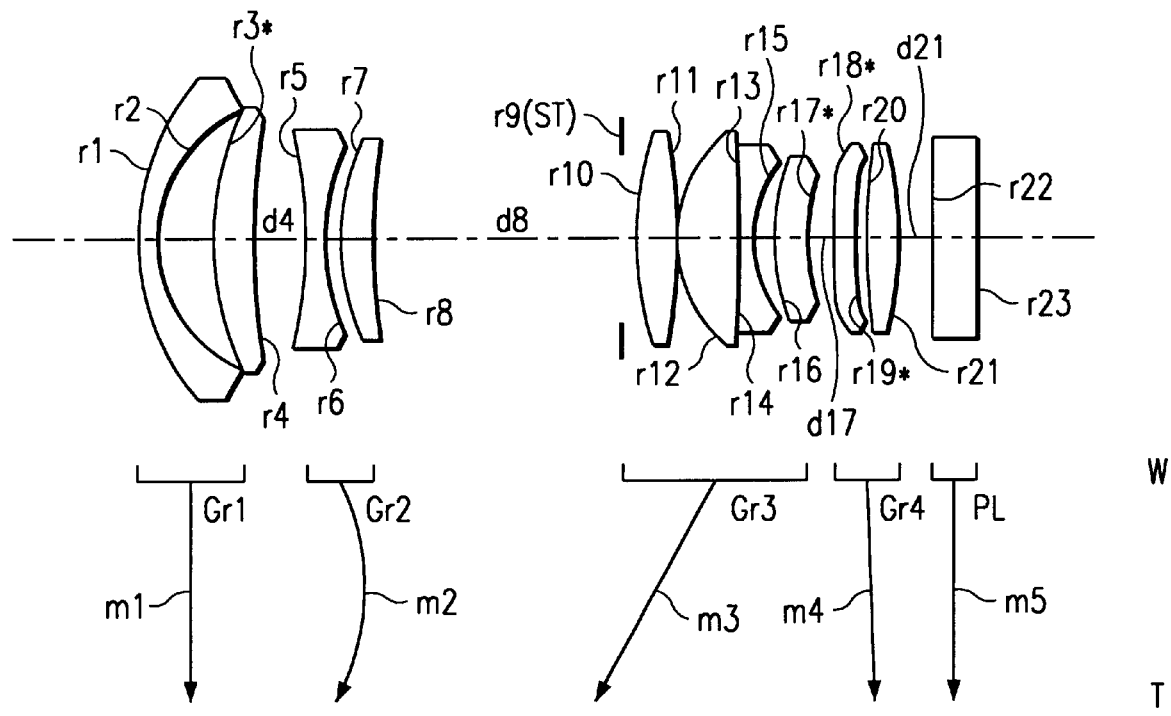
FIG. 5 is a lens arrangement diagram of a fifth embodiment (Example 5) of the invention.
Figure 6:
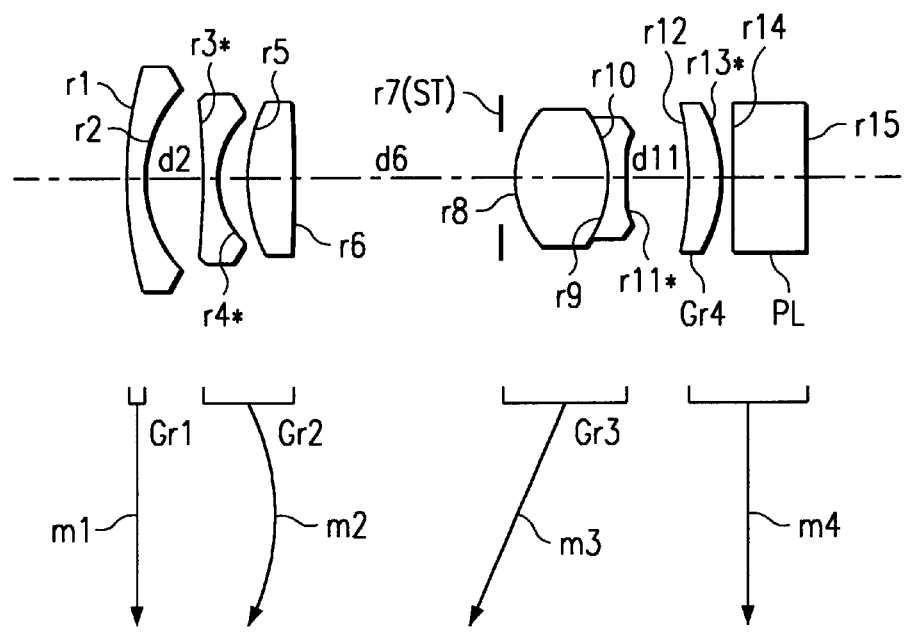
FIG. 6 is a lens arrangement diagram of a sixth embodiment (Example 6) of the invention.
Figure 7:
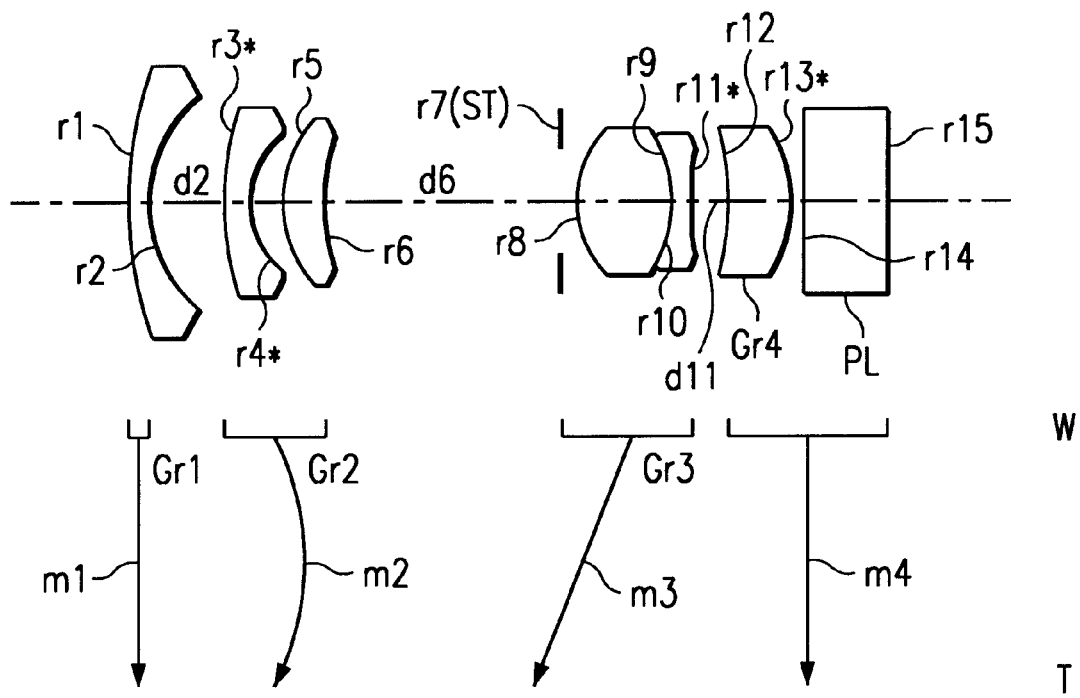
FIG. 7 is a lens arrangement diagram of a seventh embodiment (Example 7) of the invention.
Figure 8:
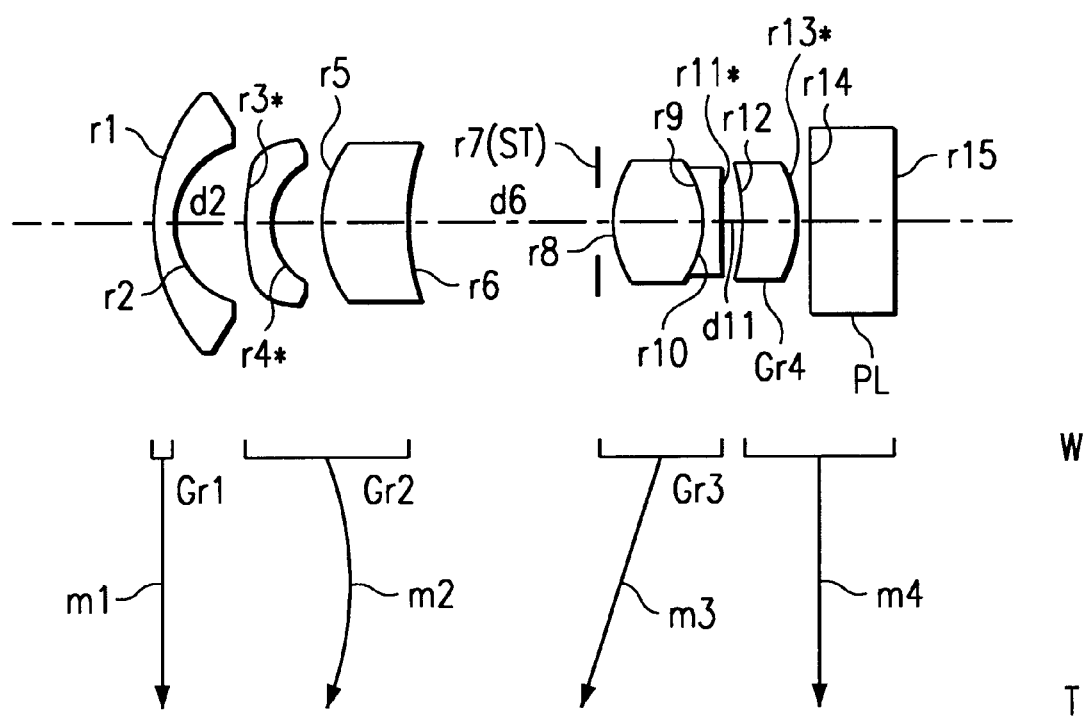
FIG. 8 is a lens arrangement diagram of an eighth embodiment (Example 8) of the invention.
Figure 9:
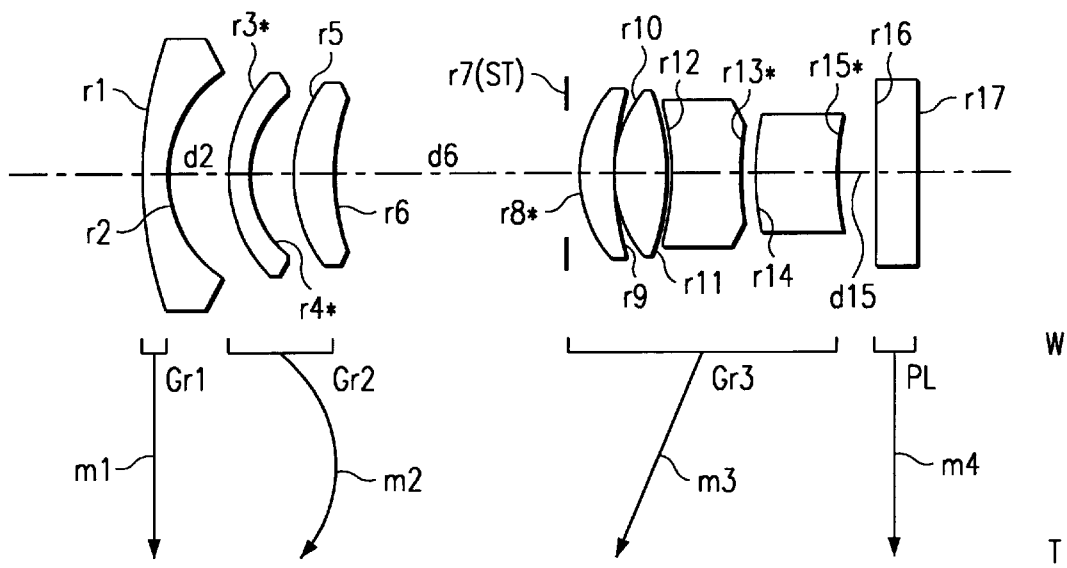
FIG. 9 is a lens arrangement diagram of a ninth embodiment (Example 9) of the invention.
Figure 19:
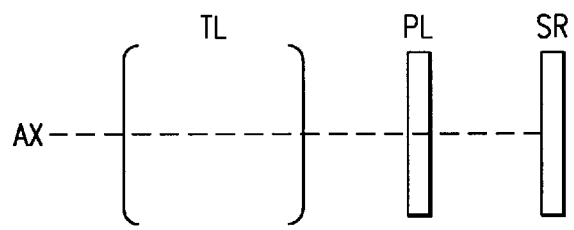
FIG. 19 is a diagram schematically illustrating the outline of the optical construction of a taking lens device embodying the invention.
Figure 20:
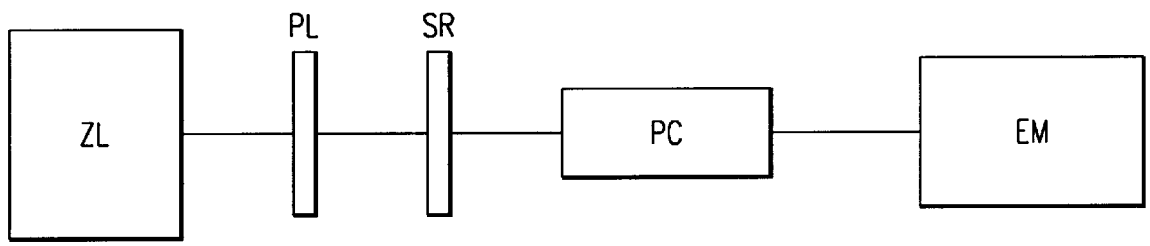
FIG. 20 is a diagram schematically illustrating the outline of a construction of an embodiment of the invention that could be used in a digital camera.
Figure 10A:
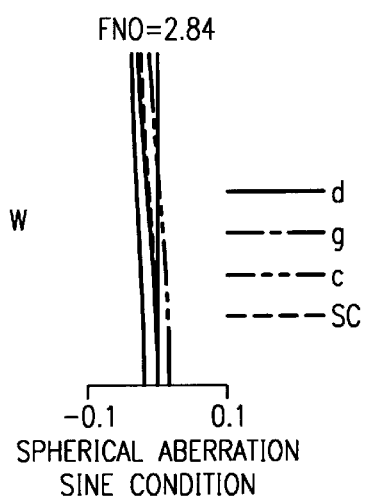
FIGS. 10A to 10I are aberration diagrams of Example 1.
Figure 10B:
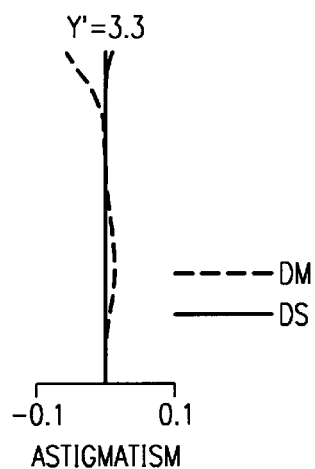
Figure 10C:
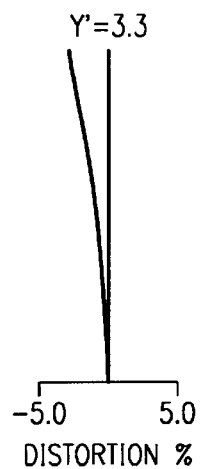
Figure 10D:
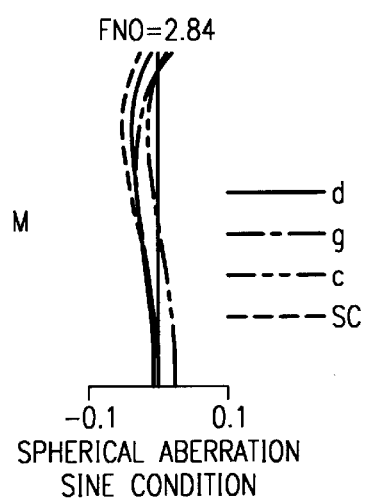
Figure 10E:
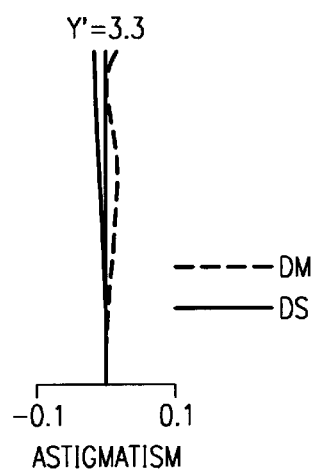
Figure 10F:
Figure 10G:
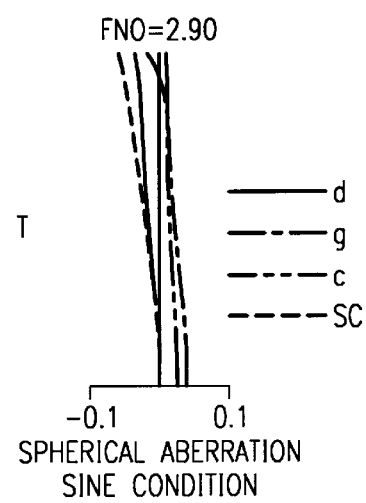
Figure 10H:
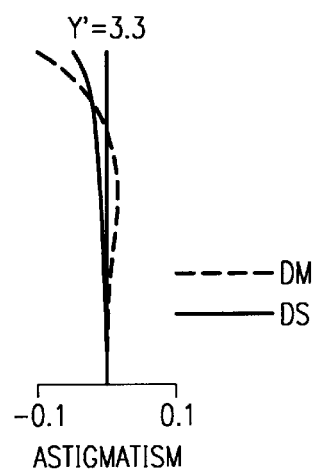
Figure 10I:
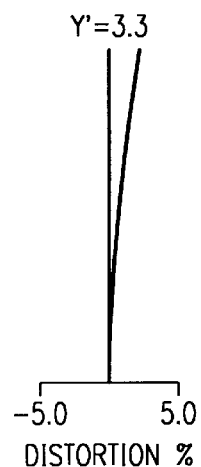
Figure 11A:
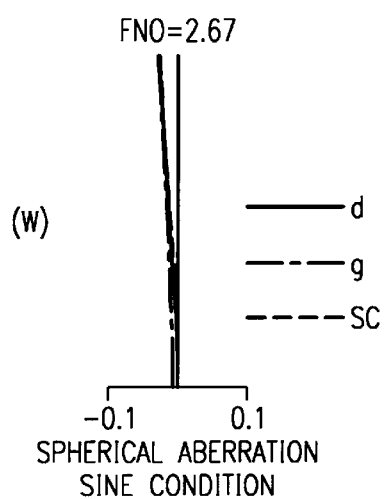
FIGS. 11A to 11I are aberration diagrams of Example 2.
Figure 11B:
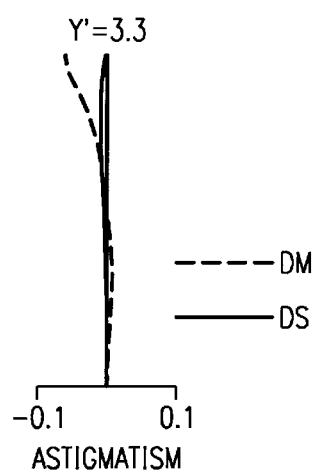
Figure 11C:
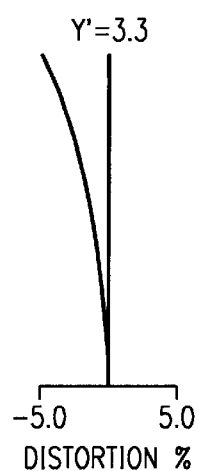
Figure 11D:
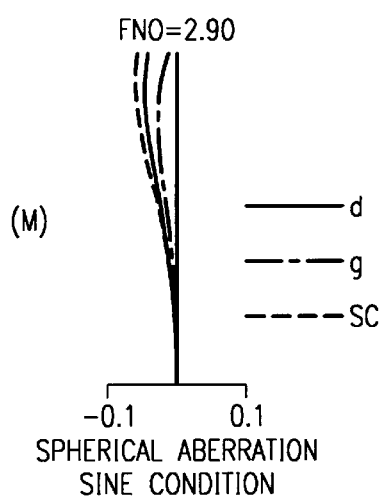
Figure 11E:
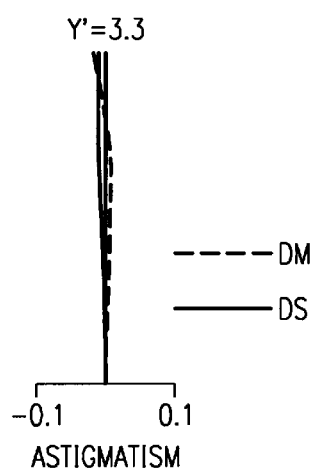
Figure 11F:
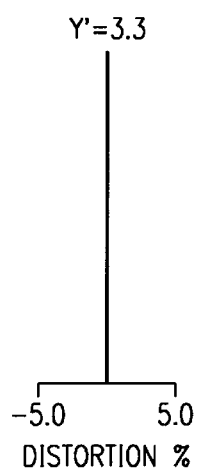
Figure 11G:
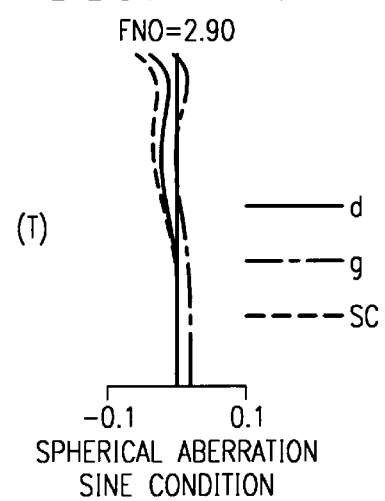
Figure 11H:
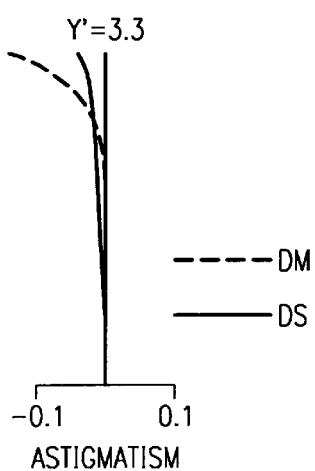
Figure 11I:
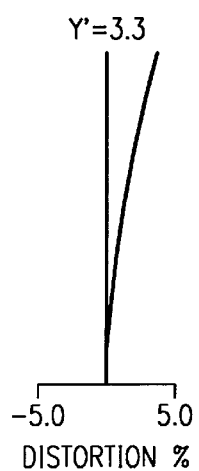
Figure 12A:
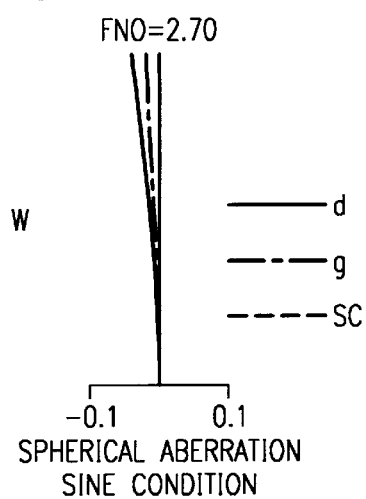
FIGS. 12A to 12I are aberration diagrams of Example 3.
Figure 12B:
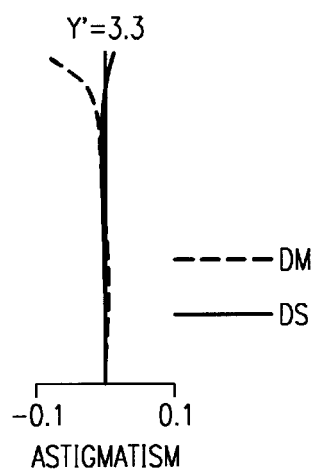
Figure 12C:
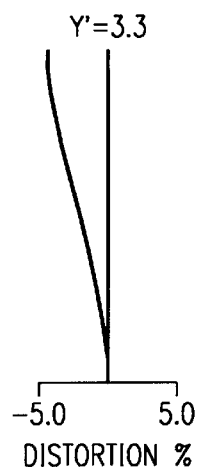
Figure 12D:
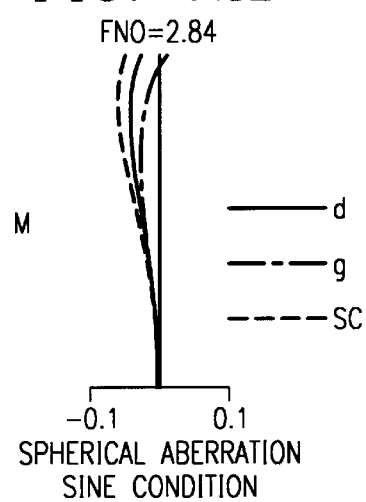
Figure 12E:
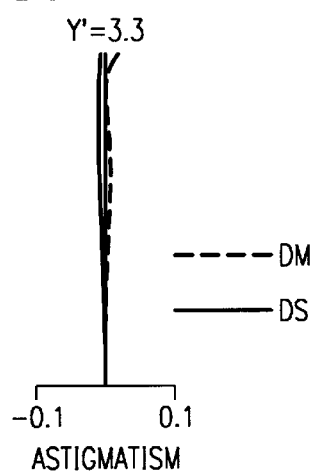
Figure 12F:
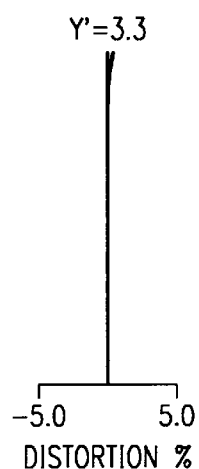
Figure 12G:
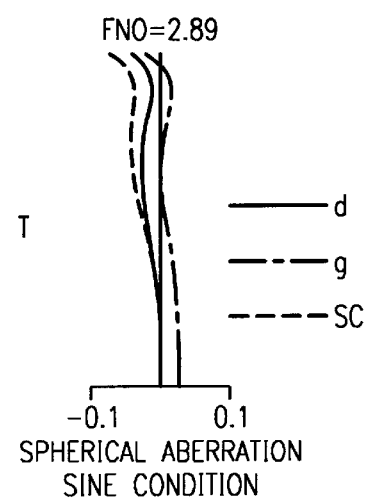
Figure 12H:
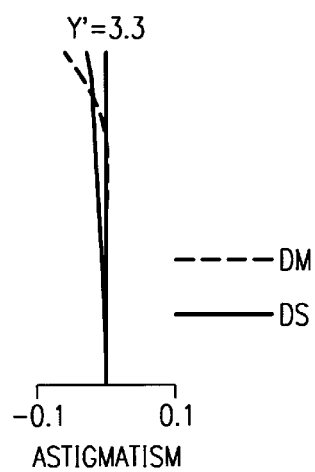
Figure 12I:
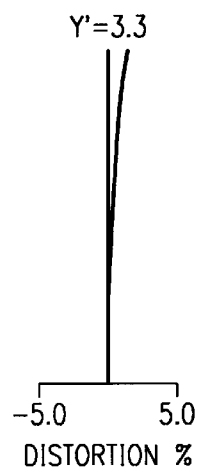
Figure 13A:
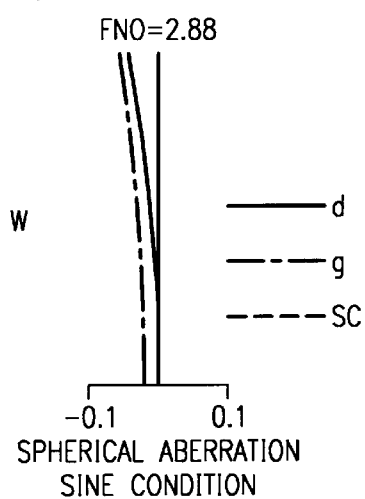
FIGS. 13A to 13I are aberration diagrams of Example 4.
Figure 13B:
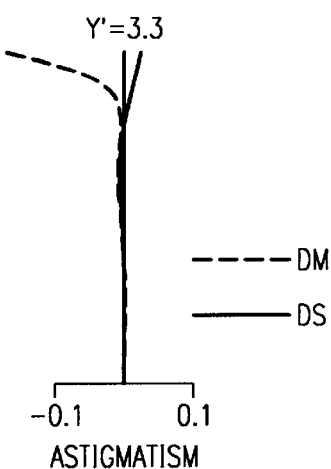
Figure 13C:
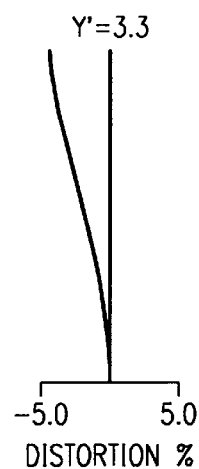
Figure 13D:
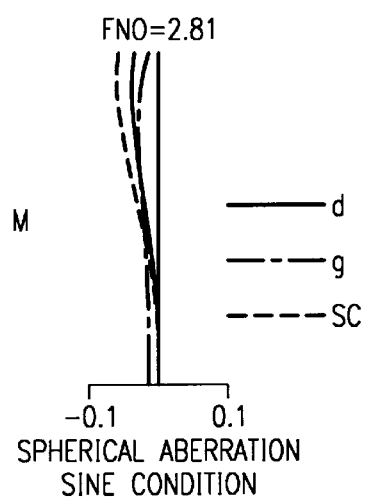
Figure 13E:
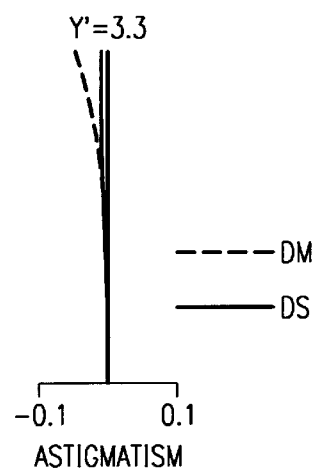
Figure 13F:
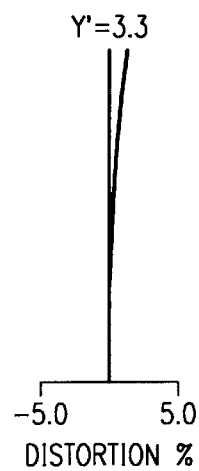
Figure 13G:
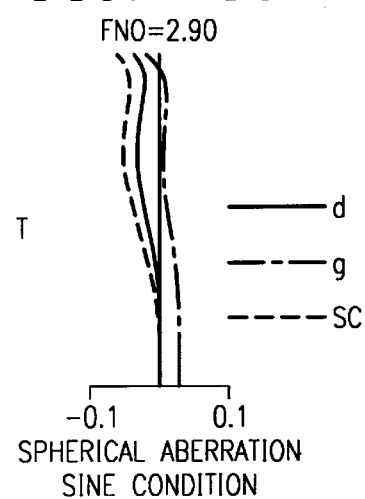
Figure 13H:
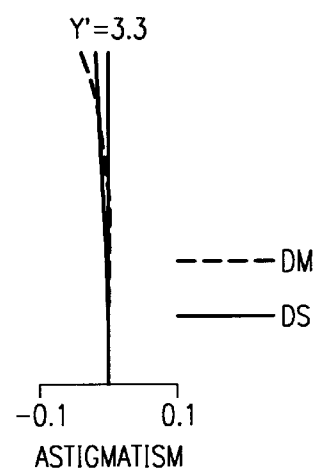
Figure 13I:
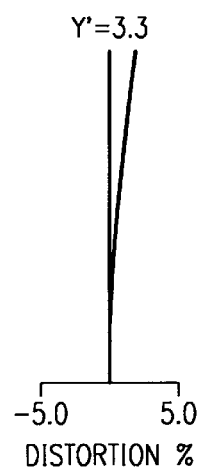
Figure 14A:
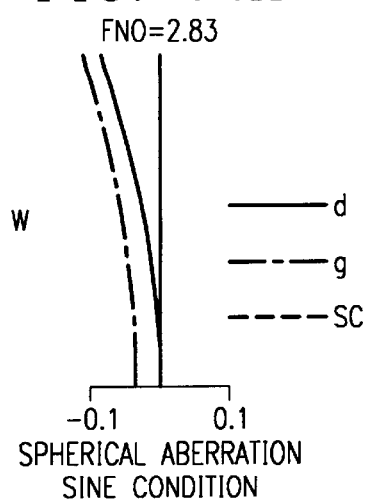
FIGS. 14A to 14I are aberration diagrams of Example 5.
Figure 14B:
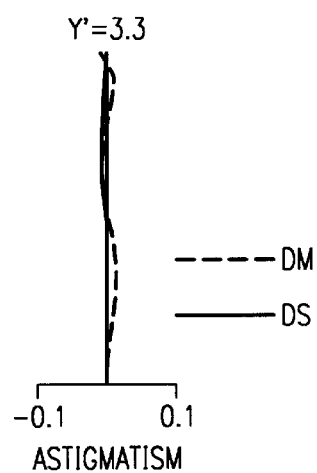
Figure 14C:
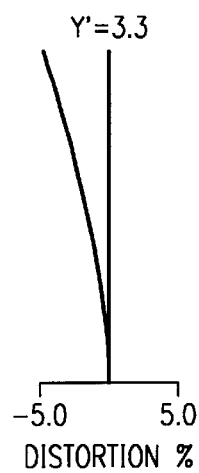
Figure 14D:
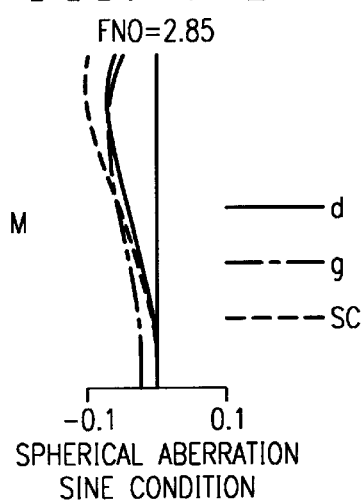
Figure 14E:
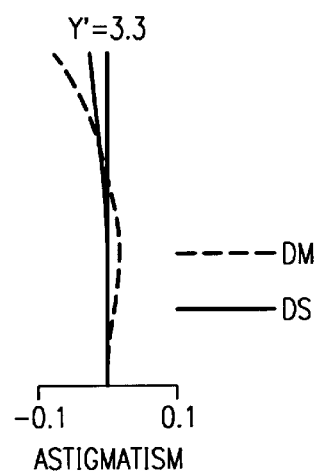
Figure 14F:
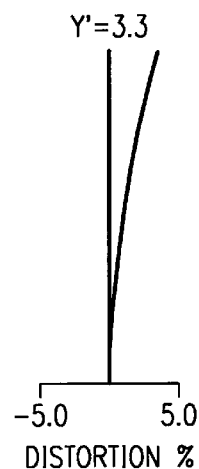
Figure 14G:
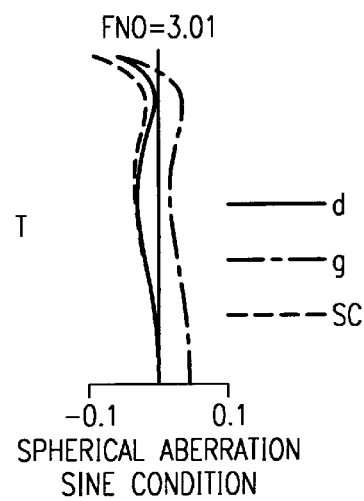
Figure 14H:
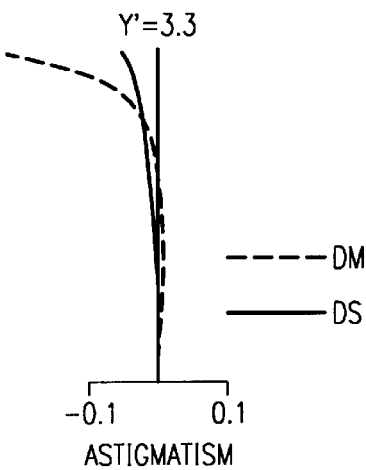
Figure 14I:
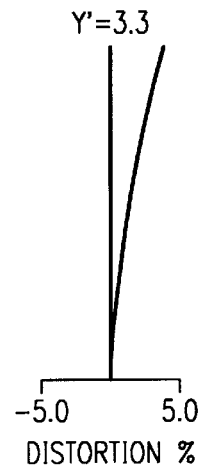
Figure 15A:
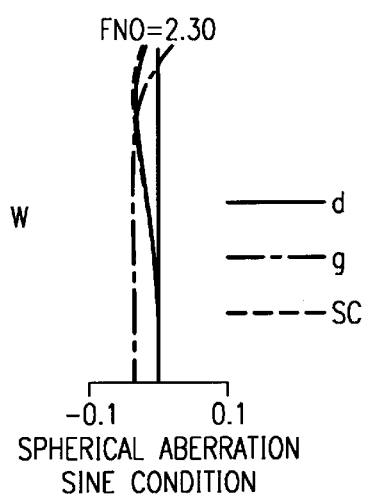
FIGS. 15A to 15I are aberration diagrams of Example 6.
Figure 15B:
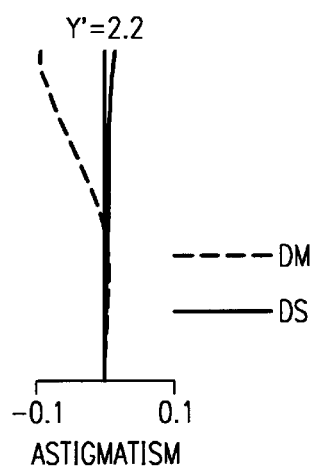
Figure 15C:
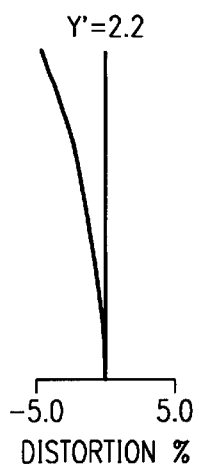
Figure 15D:
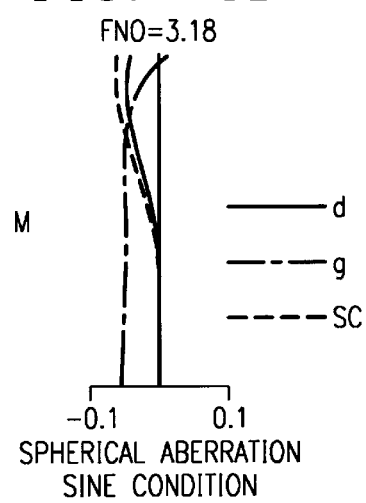
Figure 15E:
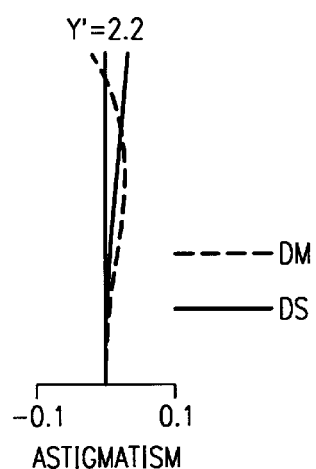
Figure 15F:
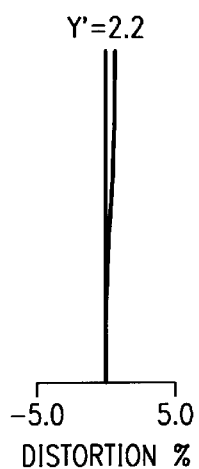
Figure 15G:
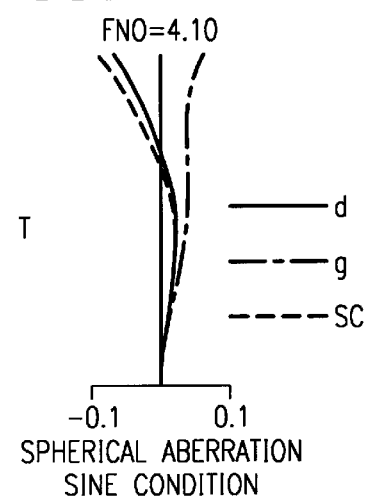
Figure 15H:
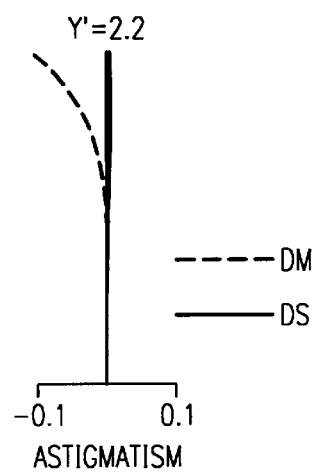
Figure 15I:
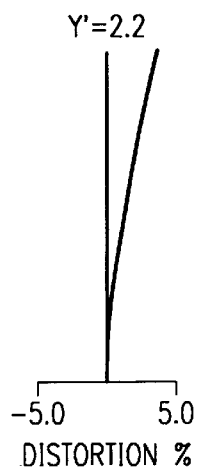
Figure 16A:
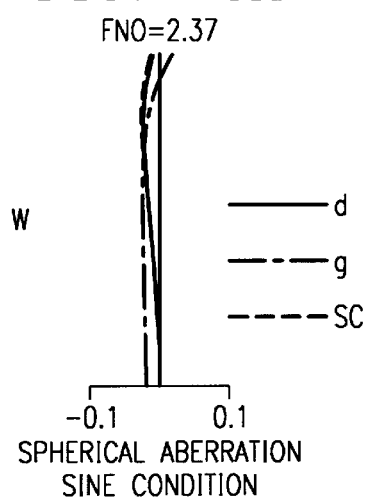
FIGS. 16A to 16I are aberration diagrams of Example 7.
Figure 16B:
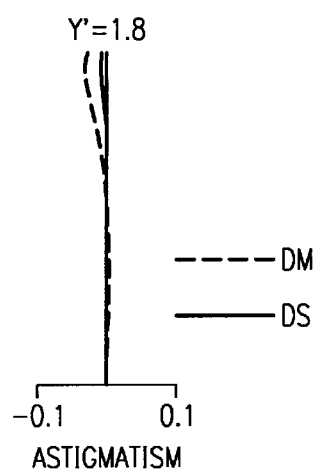
Figure 16C:
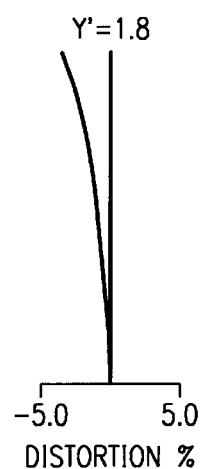
Figure 16D:
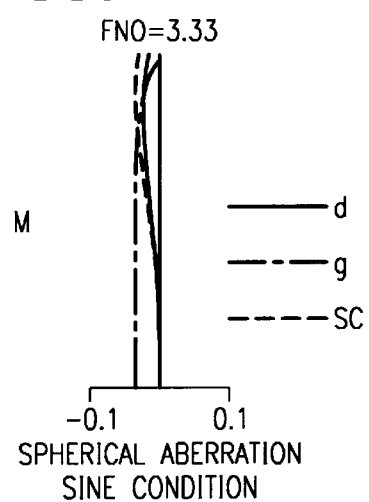
Figure 16E:
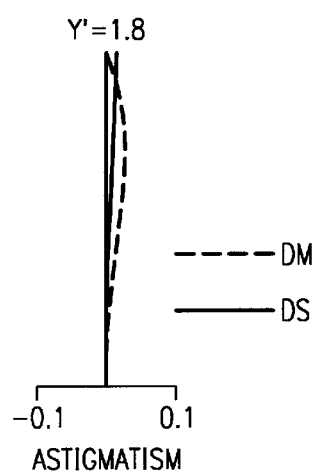
Figure 16F:
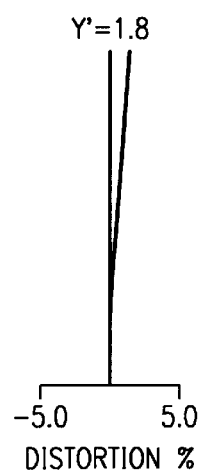
Figure 16G:
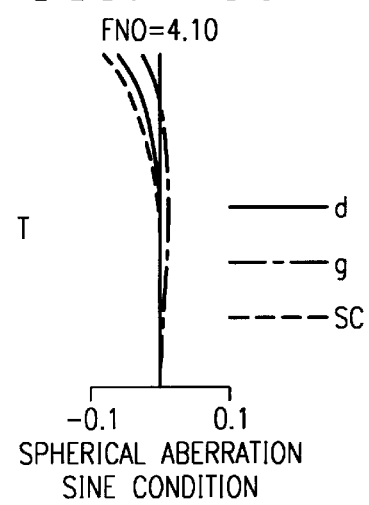
Figure 16H:
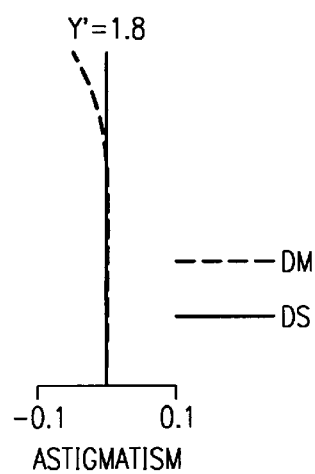
Figure 16I:
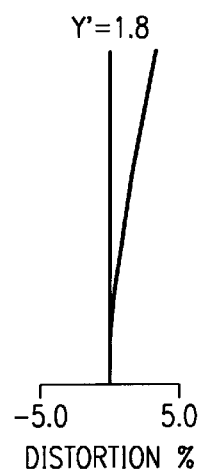
Figure 17A:
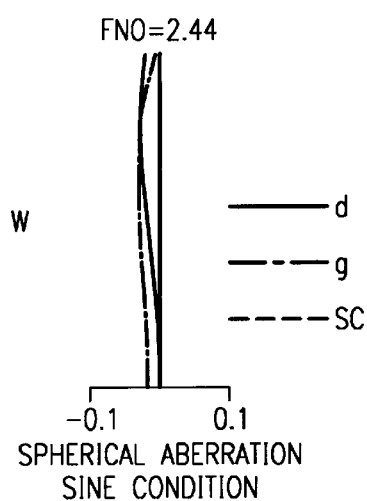
FIGS. 17A to 17I are aberration diagrams of Example 8.
Figure 17B:
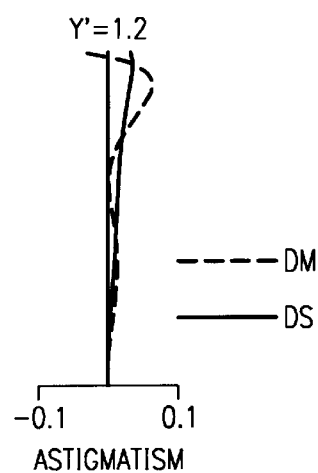
Figure 17C:
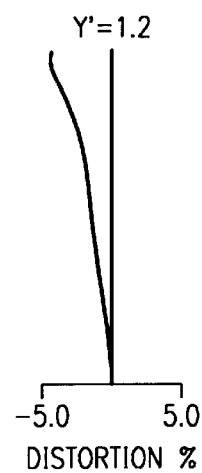
Figure 17D:
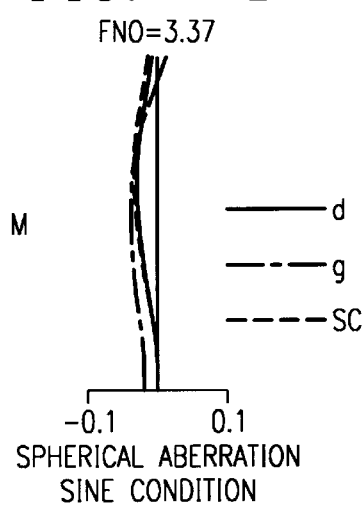
Figure 17E:
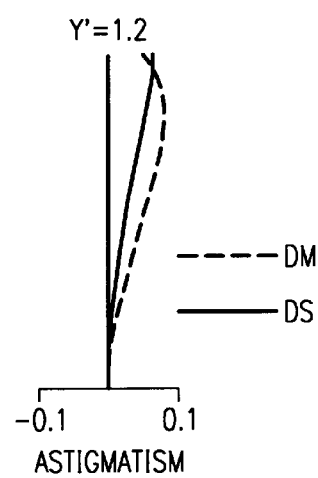
Figure 17F:
Figure 17G:
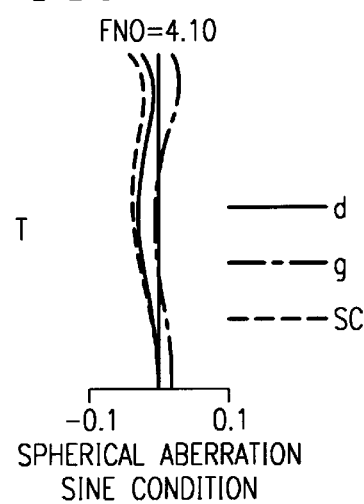
Figure 17H:
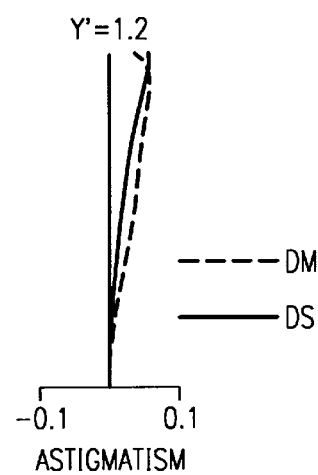
Figure 17I:
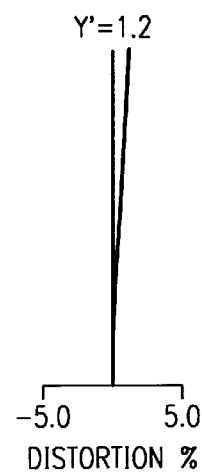
Figure 18A:
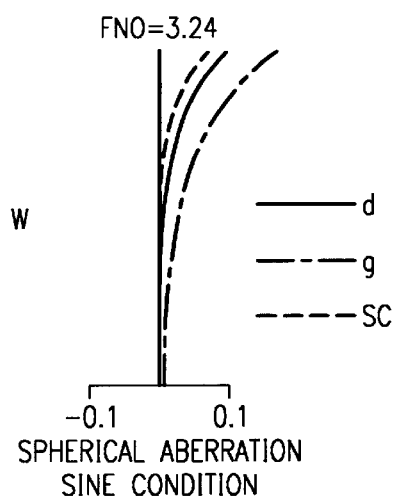
FIGS. 18A to 18I are aberration diagrams of Example 9.
Figure 18B:
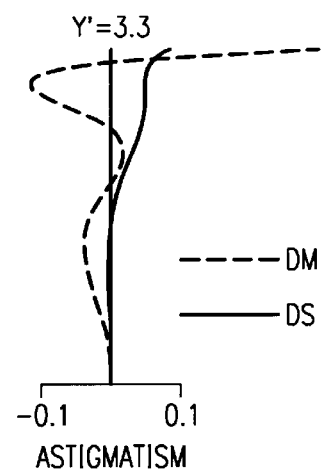
Figure 18C:
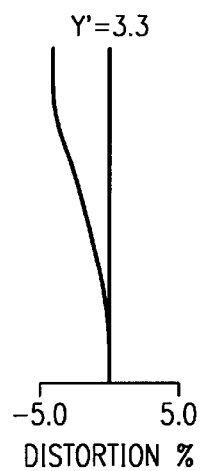
Figure 18D:
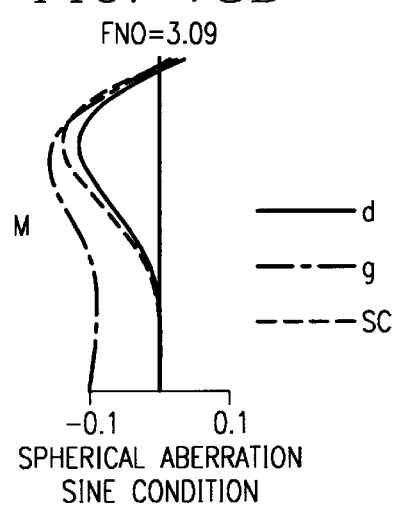
Figure 18E:
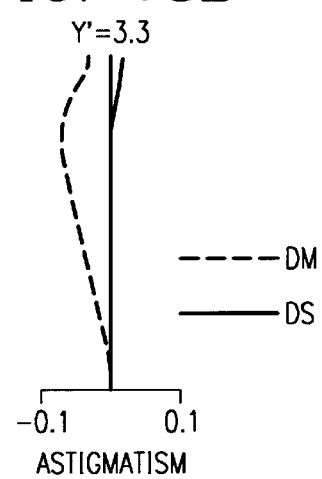
Figure 18F:
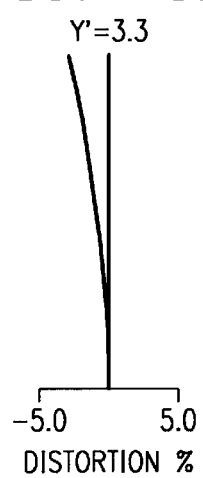
Figure 18G:
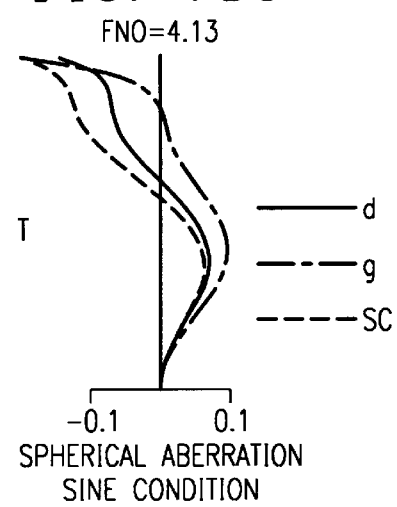
Figure 18H:
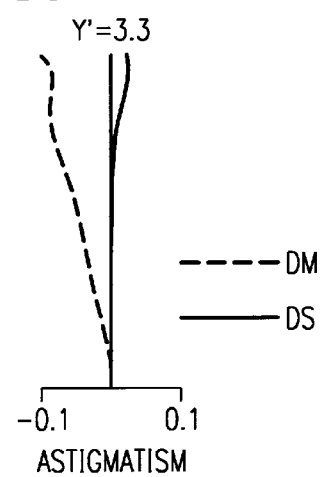
Figure 18I:
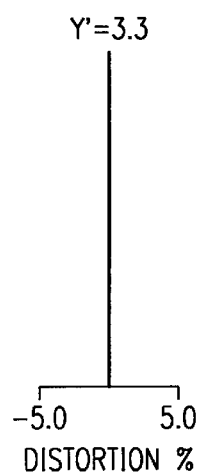

Hereinafter, optical or taking lens devices embodying the present invention will be described with reference to the drawings and the optical or taking lens device will be referred to as a taking lens device. A taking lens device optically takes in an image of a subject through an optical system and then outputs the image as an electrical signal. A taking lens device is used as a main component of a camera which is employed to shoot a still or a moving picture of a subject, for example, a digital still camera, a digital video camera, or a camera that is incorporated in or externally fitted to a device such as a digital video unit, a personal computer, a mobile computer, a portable telephone, or a personal digital assistant (PDA). A digital camera also includes a memory to store the image from the image sensor. The memory may be removable, for example, a disk, or the memory may be permanently fixed in the camera. FIG. 19 shows a taking lens device comprising, from the object (subject) side, a taking lens system TL that forms an optical image of a subject, a plane-parallel plate PL that functions as an optical low-pass filter or the like, and an image sensor SR that converts the optical image formed by the taking lens system TL into an electrical signal. FIG. 20 shows a zoom lens system ZL, an optical low-pass filter PL, an image sensor SR, processing circuits PC that would include any electronics needed to process the image, and a memory EM that could be used in a digital camera.

In all the embodiments described hereinafter, the taking lens system TL is built as a zoom lens system comprising a plurality of lens units wherein zooming is achieved by moving two or more lens units along the optical axis AX in such a way that their unit-to-unit distances vary. The image sensor SR is realized, for example, with a solid-state image sensor such as a CCD or CMOS (complementary metal-oxide semiconductor) sensor having a plurality of pixels and, by this image sensor SR, the optical image formed by the zoom lens system is converted into an electrical signal. The optical image formed by the zoom lens system has its spatial frequency characteristics adjusted by being passed through the low-pass filter PL that has predetermined cut-off frequency characteristics that are determined by the pixel pitch of the image sensor SR. This helps minimize so-called aliasing noise that appears when the optical image is converted into an electrical signal. The signal produced by the image sensor SR is subjected, as required, to predetermined digital image processing, image compression, and other processing, and is then recorded as a digital image signal in a memory (such as a semiconductor memory or an optical disk) or, if required, transmitted to another device by way of a cable or after being converted into an infrared signal.

FIGS. 1 to 9 are lens arrangement diagrams of the zoom lens system used in a first to a ninth embodiment, respectively, of the present invention, each showing the lens arrangement at the wide-angle end W in an optical sectional view. In each lens arrangement diagram, an arrow mj (where j=1, 2, . . . ) schematically indicates the movement of the j-th lens unit Grj (where j=1, 2, . . . ) and others during zooming from the wide-angle end W to the telephoto end T. Moreover, in each lens arrangement diagram, ri (where i=1, 2, 3, . . . ) indicates the i-th surface from the object side, and a surface ri marked with an asterisk (*) is an aspherical surface. Di (where i=1, 2, 3, . . . ) indicates the i-th axial distance from the object side, though only those which vary with zooming, called variable distances, are shown here.

In all the embodiments, the zoom lens system comprises at least, from the object side, a first lens unit Gr1 having a negative optical power, a second lens unit Gr2 having a negative optical power, and a third lens unit Gr3 having a positive optical power, and achieves zooming by varying the distances between these lens units. In addition, designed for a camera (for example, a digital camera) provided with a solid-state image sensor (for example, a CCD), the zoom lens system also has a glass plane-parallel plate PL, which functions as an optical low-pass filter, disposed on the image-plane side thereof. In all of the embodiments, the first lens unit Gr1 and the glass plane-parallel plate PL are kept stationary during zooming, and the third lens unit Gr3 includes an aperture stop ST at the object-side end thereof.

In the first to the eighth embodiments, the zoom lens system is built as a four-unit zoom lens of a negative-negative-positive-positive configuration. In the ninth embodiment, the zoom lens system is built as a three-unit zoom lens of a negative-negative-positive configuration. In the first to the fifth embodiments, during zooming from the wide-angle end W to the telephoto end T, the second lens unit Gr2 first moves toward the image side and then makes a U-turn to go on to move toward the object side, the third lens unit Gr3 moves toward the object side, and the fourth lens unit Gr4 moves toward the image side. In the sixth to the eighth embodiments, during zooming from the wide-angle end W to the telephoto end T, the second lens unit Gr2 first moves toward the image side and then makes a U-turn to go on to move toward the object side, and the third lens unit Gr3 moves toward the object side, but the fourth lens unit Gr4, i.e. the last lens unit, remains stationary together with the glass plane-parallel plate PL. In the ninth embodiment, during zooming from the wide-angle end W to the telephoto end T, the second lens unit Gr2 first moves toward the image side and then makes a U-turn to go on to move toward the object side, and the third lens unit Gr3 moves toward the object side.

In all of the embodiments, the first and second lens units Gr1, Gr2 are given negative optical powers. This makes it easy to build a retrofocus-type arrangement. In a digital camera, the taking lens system TL needs to be telecentric toward the image side and, by building a retrofocus-type arrangement with the negatively-powered first and second lens units Gr1, Gr2, it is possible to make the entire optical system telecentric easily. Moreover, by distributing the negative optical power needed in a retrofocus-type arrangement between the two lens units Gr1, Gr2, it is possible to keep the first lens unit Gr1 stationary during zooming. Keeping the first lens unit Gr1 stationary is advantageous in terms of lens barrel design, so that it is possible to simplify the lens barrel construction and thereby reduce the cost of the zoom lens system.

In the first, the second, and the sixth to the ninth embodiments, the first lens unit Gr1 comprises a single lens element. By comprising the first lens unit Gr1 as a single lens element, it is possible to reduce the cost of the zoom lens system by reducing the number of its constituent lens element. Moreover, comprising the first lens unit Gr1 out of a single lens element helps increase flexibility in the design of lens barrels so that it is possible to simplify the lens barrel construction and thereby reduce the cost of the zoom lens system. On the other hand, in the third to the fifth embodiments, the first lens unit Gr1 comprises two lens elements. This makes correction of relative decentered aberration possible and is thus advantageous in terms of optical performance.

In all of the embodiments, it is preferable that the zoom lens system, starting with either a negative-negative-positive or a negative-negative-positive-positive configuration, fulfill the conditions described one by one below. Needless to say, those conditions may be fulfilled singly to achieve the effects and advantages associated with the respective conditions fulfilled, but fulfilling as many of them as possible is further preferable in terms of optical performance, miniaturization, and other aspects.

It is preferable that conditional formula (1) below be fulfilled.

$$0.5 < f1/f2 < 5 \tag{1}$$

wherein
  f1 represents the focal length of the first lens unit Gr1; and
  f2 represents the focal length of the second lens unit Gr2.

Conditional formula (1) defines the preferable ratio of the focal length of the first lens unit Gr1 to that of the second lens unit Gr2. If the lower limit of conditional formula (1) were to be transgressed, the focal length of the first lens unit Gr1 would be too short. This would cause such a large distortion (especially a negative distortion on the wide-angle side) that it would be impossible to secure satisfactory optical performance. By contrast, if the upper limit of conditional formula (1) would be transgressed, the focal length of the first lens unit Gr1 would be too long. This would make the negative optical power of the first lens unit Gr1 so weak that the first lens unit Gr1 would need to be made larger in diameter, which is undesirable in terms of miniaturization.

It is preferable that conditional formula (2) below be fulfilled.

$$1.5 < |f12/fw| < 4 \tag{2}$$

where
  f12 represents the composite focal length of the first and second lens units Gr1, Gr2 at the wide-angle end W; and
  fw represents the focal length of the entire optical system at the wide-angle end W.

Conditional formula (2) defines the preferable condition to be fulfilled by the composite focal length of the first and second lens units Gr1, Gr2 at the wide-angle end W. If the upper limit of conditional formula (2) were to be transgressed, the composite focal length of the first and second lens units Gr1, Gr2 would be too long, and thus the total length of the entire optical system would be too long. Moreover, the composite negative power of the first and second lens units Gr1, Gr2 would be so weak that these lens units would need to be made larger in external diameter. Thus, it would be impossible to make the zoom lens system compact. By contrast, if the lower limit of conditional formula (2) were to be transgressed, the composite focal length of the first and second lens units Gr1, Gr2 would be too short. This would cause such a large negative distortion in the first and second lens units Gr1, Gr2 at the wide-angle end W that it would be difficult to correct the distortion.

It is preferable that conditional formula (3) below be fulfilled, and it is further preferably fulfilled together with conditional formula (2) noted previously.

$$0.058 < (\tan \omega w)^2 \times fw/TLw < 0.9 \tag{3}$$

where
  tan ωw represents the half view angle at the wide-angle end W;
  fw represents the focal length of the entire optical system at the wide-angle end W; and
  TLw represents the total length (i.e. the distance from the first vertex to the image plane) at the wide-angle end W.

Conditional formula (3) defines the preferable relation between the view angle and the total length at the wide-angle end W. If the upper limit of conditional formula (3) were to be transgressed, the optical power of the individual lens units would be too strong, and thus it would be difficult to correct the aberration that occurs therein. By contrast, if the lower limit of conditional formula (3) were to be transgressed, the total length would be too long, which is undesirable in terms of miniaturization.

It is preferable that conditional formula (4) below be fulfilled, and it is further preferably fulfilled together with conditional formula (2) noted previously.

$$10 < TLw \times Fnt/(fw \times \tan \omega w) < 50 \tag{4}$$

where
  TLw represents the total length (i.e., the distance from the first vertex to the image plane) at the wide-angle end W;
  Fnt represents the f-number (FNO) at the telephoto end T;
  fw represents the focal length of the entire optical system at the wide-angle end W; and
  tan ωw represents the half view angle at the wide-angle end W.

Conditional formula (4) defines the preferable relation between the total length at the wide-angle end W and the f-number at the telephoto end T. If the upper limit of conditional formula (4) were to be transgressed, the total length at the wide-angle end W would be too long, which is undesirable in terms of miniaturization. By contrast, if the lower limit of conditional formula (4) were to be transgressed, the f-number at the telephoto end T would be too low, and thus it would be difficult to correct the spherical aberration that would occur in the third lens unit Gr3 in that zoom position.

It is preferable that the third lens unit Gr3 comprises, as in the first to the fifth and the ninth embodiments, of at least two positive lens elements and one negative lens element. Moreover, it is further preferable that, as in all of the embodiments, the third lens unit Gr3 have an aspherical surface at the image-side end thereof. Let the maximum effective optical path radius of an aspherical surface be Ymax, and let the height in a direction perpendicular to the optical axis be Y. Then, it is preferable that the aspherical surface disposed at the image-side end of the third lens unit Gr3 fulfill conditional formula (5) below at Y=0.7Ymax, and further preferably for any height Y in the range 0.1Ymax ≦ Y ≦ 0.7Ymax.

$$-0.6 < (|X|-X0|)/[C0 \cdot (N'-N) \cdot f3] < 0 \tag{5}$$

where
  X represents the surface shape (mm) of the aspherical surface (i.e. the displacement along the optical axis at the height Y in a direction perpendicular to the optical axis of the aspherical surface);
  X0 represents the surface shape (mm) of the reference spherical surface of the aspherical surface (i.e. the displacement along the optical axis at the height Y in a direction perpendicular to the optical axis of the reference spherical surface);
  C0 represents the curvature (mm$^{-1}$) of the reference spherical surface of the aspherical surface;
  N represents the refractive index for the d-line of the object-side medium of the aspherical surface;

N' represents the refractive index for the d-line of the image-side medium of the aspherical surface; and f3 represents the focal length (mm) of the third lens unit Gr3.

Here, the surface shape X of the aspherical surface, and the surface shape X0 of its reference spherical surface are respectively given by formulae (AS) and (RE) below.

$$X = (C0 \cdot Y^2)/(1+\sqrt{1-\epsilon \cdot C0^2 \cdot Y^2}) + \Sigma(Ai \cdot Y^i) \quad \text{(AS)}$$

$$X0 = (C0 \cdot Y^2)/(1+\sqrt{1-C0^2 \cdot Y^2}) \quad \text{(RE)}$$

where

C0 represents the curvature (mm$^{-1}$) of the reference spherical surface of the aspherical surface;

Y represents the height in a direction perpendicular to the optical axis;

$\epsilon$ represents the quadric surface parameter; and

Ai represents the aspherical surface coefficient of order i.

Conditional formula (5) dictates that the aspherical surface be so shaped as to weaken the positive power within the third lens unit Gr3, and thus defines the preferable condition to be fulfilled to ensure proper correction of spherical aberration from the middle-focal-length region M to the telephoto end T. If the upper limit of conditional formula (5) were to be transgressed, spherical aberration would incline too much toward the under side. By contrast, if the lower limit of conditional formula (5) were to be transgressed, spherical aberration would incline too much toward the over side.

It is preferable that, as in all of the embodiments, the zoom unit disposed closest to the image plane have a positive power, and it is preferable that the zoom unit having this positive power comprises at least one positive lens element. In cases, as in the first, the fourth, and the sixth to the eighth embodiments, where this zoom unit having the above-mentioned positive power comprises a single positive lens element, it is preferable that this positive lens element fulfill conditional formula (6) below.

$$0.05 < (CR1-CR2)/(CR1+CR2) < 5 \quad (6)$$

where

CR1 represents the radius of curvature of the object-side surface; and

CR2 represents the radius of curvature of the image-side surface.

Conditional formula (6) defines the preferable shape of the positive lens element included in the zoom unit disposed closest to the image plane. If the upper limit of conditional formula (6) were to be transgressed, the surface of this positive lens element facing the object would be highly concave, and therefore, to avoid interference with the lens unit disposed on the object side of that surface, it would be necessary to secure a wide gap in between. This is undesirable in terms of miniaturization. By contrast, if the lower limit of conditional formula (6) were to be transgressed, the positive optical power of the object-side surface of the positive lens element would be so strong that it would be difficult to correct the aberration that would be caused by that surface.

It is preferable that the first to third lens units Gr1 to Gr3 fulfill conditional formula (7) below.

$$0.4 < |f12/f3| < 1.5 \quad (7)$$

where f12 represents the composite focal length of the first and second lens units Gr1, Gr2, at the wide-angle end W; and f3 represents the focal length (mm) of the third lens unit Gr3.

Conditional formula (7) defines the preferable ratio of the composite focal length of the first and second lens units Gr1, Gr2 to the focal length of the third lens unit Gr3. If the upper limit of conditional formula (7) were to be transgressed, the composite focal length of the first and second lens units Gr1, Gr2 would be relatively too long. Thus, if the upper limit of conditional formula (7) were to be transgressed, the exit pupil would be located closer to the image plane, and this is not desirable. As described earlier, in a digital still camera or the like, the use of a CCD and other factors require that rays striking the image plane be telecentric, and therefore it is preferable that the exit pupil be located closer to the object. By contrast, if the lower limit of conditional formula (7) were to be transgressed, the composite focal length of the first and second lens units Gr1, Gr2 would be relatively too short. Thus, if the lower limit of conditional formula (7) were to be transgressed, it would be difficult to correct the negative distortion that would occur in the first and second lens units Gr1, Gr2.

In all of the illustrated embodiments, all of the lens units are comprised solely of refractive lenses that deflect light incident thereon by refraction (i.e. lenses of the type that deflect light at the interface between two media having different refractive indices). However, any of these lens units may include, for example, a diffractive lens that deflects light incident thereon by diffraction, a refractive-diffractive hybrid lens that deflects light incident thereon by the combined effects of refraction and diffraction, a gradient-index lens that deflects light incident thereon with varying refractive indices distributed in a medium, or a lens of any other type.

In any of the embodiments, a surface having no optical power (for example, a reflective, refractive, or diffractive surface) may be disposed in the optical path so that the optical path is bent before, after, or in the midst of the zoom lens system. Where to bend the optical path may be determined to suit particular needs. By bending the optical path appropriately, it is possible to make a camera apparently slimmer. It is even possible to build an arrangement in which zooming or the collapsing movement of a lens barrel does not cause any change in the thickness of a camera. For example, by disposing a mirror after the first lens unit Gr1, which is kept stationary during zooming, so that the optical path is bent by 90° by the reflecting surface of the mirror, it is possible to keep the front-to-rear length of the zoom lens system constant and thereby make a camera slimmer.

In all of the embodiments, an optical low-pass filter having the shape of a plane-parallel plate PL is disposed between the last surface of the zoom lens system and the image sensor SR. However, as this low-pass filter, it is also possible to use a birefringence-type low-pass filter made of quartz or the like having its crystal axis aligned with a predetermined direction, a phase-type low-pass filter that achieves the required optical cut-off frequency characteristics by exploiting diffraction, or a low-pass filter of any other type.

PRACTICAL EXAMPLES

Hereinafter, practical examples of the construction of the zoom lens system used in taking lens devices embodying the present invention will be presented in more detail with reference to their construction data, aberration diagrams, and other data. Examples 1 to 9 presented below correspond respectively to the first to ninth embodiments described hereinbefore, and the lens arrangement diagrams (FIGS. 1 to 9) showing the lens arrangement of the first to the ninth embodiments apply also to Examples 1 to 9, respectively.

Tables 1 to 9 list the construction data of Examples 1 to 9, respectively. In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) respectively represent the refractive index (Nd) for the d-line and the Abbe number (vd) of the i-th optical element from the object side. A surface whose radius of curvature ri is marked with an asterisk (*) is an aspherical surface, of which the surface shape is defined by formula (AS) noted earlier. Moreover, in the construction data, for each of those axial distances that vary with zooming (i.e. variable aerial distances), three values are given that are, from left, the axial distance at the wide-angle end W (the shortest-focal-length end), the axial distance in the middle position M (the middle-focal-length position), and the axial distance at the telephoto end T (the longest-focal-length end). Also listed are the focal length f, (in mm), the f-number FNO, and the view angle (2ω, °) of the entire optical system in those three focal-length positions W, M, and T, and the aspherical surface data. Table 10 lists the values of the conditional formulae as actually observed in Examples 1 to 9.

FIGS. 10A–10I, 11A–11I, 12A–12I, 13A–13I, 14A–14I, 15A–15I, 16A–16I, 17A–17I, and 18A–18I are aberration diagrams of Examples 1 to 9, respectively. Of these diagrams, FIGS. 10A–10C, 11A–11C, 12A–12C, 13A–13C, 14A–14C, 15A–15C, 16A–16C, 17A–17C, and 18A–18C show the aberration observed at the wide-angle end W, FIGS. 10D–10F, 11D–11F, 12D–12F, 13D–13F, 14D–14F, 15D–15F, 16D–16F, 17D–17F, and 18D–18F show the aberration observed in the middle position M, and FIGS. 10G–10I, 11G–11I, 12G–12I, 13G–13I, 14G–14I, 15G–15I, 16G–16I, 17G–17I, and 18G–18I show the aberration observed at the telephoto end T. Of these diagrams, FIGS. 10A, 10D, 10G, 11A, 11D, 11G, 12A, 12D, 12G, 13A, 13D, 13G, 14A, 14D, 14G, 15A, 15D, 15G, 16A, 16D, 16G, 17A, 17D, 17G, 18A, 18D, and 18G show spherical aberration, FIGS. 10B, 10E, 10H, 11B, 11E, 11H, 12B, 12E, 12H, 13B, 13E, 13H, 14B, 14E, 14H, 15B, 15E, 15H, 16B, 16E, 16H, 17B, 17E, 17H, 18B, 18E, and 18H show astigmatism, and FIGS. 10C, 10F, 10I, 11C, 11F, 11I, 12C, 12F, 12I, 13C, 13F, 13I, 14C, 14F, 14I, 15C, 15F, 15I, 16C, 16F, 16I, 17C, 17F, 17I, 18C, 18F, and 18I show distortion. In these diagrams, Y' represents the maximum image height (mm). In the diagrams showing spherical aberration, a solid line d, a dash-and-dot line g, and a dash-dot-dot line c show the spherical aberration for the d-line, for the g-line, and for the c-line, respectively, and a broken line SC shows the sine condition. In the diagrams showing astigmatism, a broken line DM and a solid line DS represent the astigmatism for the d-line on the meridional plane and on the sagittal plane, respectively. In the diagrams showing distortion, a solid line represents the distortion (%) for the d-line.

TABLE 1

Construction Data of Example 1
f = 4.45~7.8~12.7, FNO = 2.84~2.84~2.90,
2ω = 75.8~46.8~28.9

| Radius of Curvature | Axial Distance | Refractive Index | Abbe Number |
|---|---|---|---|
| r1 = 18.401 | | | |
| | d1 = 0.800 | N1 = 1.54072 | v1 = 47.22 |
| r2 = 5.940 | | | |
| | d2 = 3.275~6.628~5.000 | | |
| r3* = −46.268 | | | |
| | d3 = 0.800 | N2 = 1.52200 | v2 = 52.20 |
| r4* = 7.744 | | | |
| | d4 = 1.115 | | |
| r5 = 10.618 | | | |
| | d5 = 1.784 | N3 = 1.84666 | v3 = 23.82 |
| r6 = 29.518 | | | |
| | d6 = 14.440~6.151~2.201 | | |
| r7 = ∞(ST) | | | |
| | d7 = 0.600 | | |
| r8 = 10.096 | | | |
| | d8 = 1.673 | N4 = 1.75450 | v4 = 51.57 |
| r9 = 35.493 | | | |
| | d9 = 0.100 | | |
| r10 = 6.646 | | | |
| | d10 = 2.391 | N5 = 1.75450 | v5 = 51.57 |
| r11 = 42.505 | | | |
| | d11 = 0.436 | | |
| r12 = 372.791 | | | |
| | d12 = 0.800 | N6 = 1.84666 | v6 = 23.82 |
| r13 = 5.188 | | | |
| | d13 = 0.800 | | |
| r14 = 6.476 | | | |
| | d14 = 2.091 | N7 = 1.52200 | v7 = 52.20 |
| r15* = 43.112 | | | |
| | d15 = 1.283~8.292~13.780 | | |
| r16* = −50.000 | | | |
| | d16 = 2.639 | N8 = 1.75450 | v8 = 51.57 |
| r17* = −9.674 | | | |
| | d17 = 2.774~0.700~0.790 | | |
| r18 = ∞ | | | |
| | d18 = 2.000 | N9 = 1.51680 | v9 = 64.20 |
| r19 = ∞ | | | |

Aspherical Surface Data of Surface r3

$\epsilon = 1.0000$, $A4 = 0.66858 \times 10^{-3}$, $A6 = -0.25227 \times 10^{-4}$,
$A8 = 0.41627 \times 10^{-6}$
Aspherical Surface Data of Surface r4

$\epsilon = 1.0000$, $A4 = 0.27983 \times 10^{-3}$, $A6 = -0.33808 \times 10^{-4}$,
$A8 = 0.43681 \times 10^{-6}$
Aspherical Surface Data of Surface r15

$\epsilon = 1.0000$, $A4 = 0.14395 \times 10^{-2}$, $A6 = 0.21710 \times 10^{-4}$,
$A8 = 0.13202 \times 10^{-5}$
Aspherical Surface Data of Surface r16

$\epsilon = 1.0000$, $A4 = -0.39894 \times 10^{-3}$, $A6 = -0.41378 \times 10^{-4}$,
$A8 = 0.19806 \times 10^{-5}$
Aspherical Surface Data of Surface r17

$\epsilon = 1.0000$, $A4 = 0.27510 \times 10^{-3}$, $A6 = -0.46341 \times 10^{-4}$,
$A8 = 0.17216 \times 10^{-5}$

TABLE 2

Construction Data of Example 2
f = 4.45~7 8~12.7, FNO = 2.67~2.90~2.90,
2ω = 76.9~46.6~28.5

| Radius of Curvature | Axial Distance | Refractive Index | Abbe Number |
|---|---|---|---|
| r1 = 12.628 | | | |
| | d1 = 1.000 | N1 = 1.58913 | v1 = 61.25 |

TABLE 2-continued

Construction Data of Example 2
f = 4.45~7.8~12.7, FNO = 2.67~2.90~2.90,
2ω = 76.9~46.6~28.5

| | | | |
|---|---|---|---|
| r2 = 5.734 | | | |
| | d2 = 3.800~6.823~4.759 | | |
| r3* = −17.691 | | | |
| | d3 = 0.800 | N2 = 1.52200 | ν2 = 52.20 |
| r4* = 8.550 | | | |
| | d4 = 1.669 | | |
| r5 = 14.585 | | | |
| | d5 = 1.500 | N3 = 1.84666 | ν3 = 23.78 |
| r6 = 75.547 | | | |
| | d6 = 12.939~5.191~1.490 | | |
| r7 = ∞(ST) | | | |
| | d7 = 0.600 | | |
| r8 = 10.478 | | | |
| | d8 = 1.730 | N4 = 1.78831 | ν4 = 47.32 |
| r9 = 48.647 | | | |
| | d9 = 0.100 | | |
| r10 = 5.925 | | | |
| | d10 = 2.491 | N5 = 1.58913 | ν5 = 61.25 |
| r11 = 20.627 | | | |
| | d11 = 0.010 | N6 = 1.51400 | ν6 = 42.83 |
| r12 = 20.627 | | | |
| | d12 = 0.700 | N7 = 1.84666 | ν7 = 23.78 |
| r13 = 4.609 | | | |
| | d13 = 0.632 | | |
| r14 = 4.757 | | | |
| | d14 = 2.626 | N8 = 1.52200 | ν8 = 52.20 |
| r15* = 14.654 | | | |
| | d15 = 1.439~7.835~13.100 | | |
| r16* = −50.000 | | | |
| | d16 = 1.000 | N9 = 1.58340 | ν9 = 30.23 |
| r17* = 70.535 | | | |
| | d17 = 0.591 | | |
| r18 = −94.053 | | | |
| | d18 = 1.802 | N10 = 1.78590 | ν10 = 43.93 |
| r19 = −8.643 | | | |
| | d19 = 2.371~0.700~1.200 | | |
| r20 = ∞ | | | |
| | d20 = 2.000 | N11 = 1.51680 | ν11 = 64.20 |
| r21 = ∞ | | | |

Aspherical Surface Data of Surface r3

$\epsilon = 1.0000$, $A4 = 0.56623 \times 10^{-3}$, $A6 = -0.23264 \times 10^{-4}$,
$A8 = 0.30123 \times 10^{-6}$
Aspherical Surface Data of Surface r4

$\epsilon = 1.0000$, $A4 = 0.43838 \times 10^{-4}$, $A6 = -0.28329 \times 10^{-4}$,
$A8 = 0.33275 \times 10^{-6}$
Aspherical Surface Data of Surface r15

$\epsilon = 10000$, $A4 = 0.21324 \times 10^{-2}$, $A6 = 0.32366 \times 10^{-4}$,
$A8 = 0.53566 \times 10^{-5}$
Aspherical Surface Data of Surface r16

$\epsilon = 1.0000$, $A4 = 0.95453 \times 10^{-3}$, $A6 = -0.13928 \times 10^{-3}$,
$A8 = 0.43729 \times 10^{-5}$
Aspherical Surface Data of Surface r17

$\epsilon = 1.0000$, $A4 = 0.20120 \times 10^{-2}$, $A6 = -0.13956 \times 10^{-3}$,
$A8 = 0.38295 \times 10^{-5}$

TABLE 3

Construction Data of Example 3
f = 4.45~7.8~12.7, FNO = 2.70~2.84~2.89,
2ω = 76.6~46.4~29.1

| Radius of Curvature | Axial Distance | Refractive Index | Abbe Number |
|---|---|---|---|
| r1 = 11.274 | | | |
| | d1 = 1.000 | N1 = 1.74330 | ν1 = 49.22 |

TABLE 3-continued

Construction Data of Example 3
f = 4.45~7.8~12.7, FNO = 2.70~2.84~2.89,
2ω = 76.6~46.4~29.1

| | | | |
|---|---|---|---|
| r2 = 5.143 | | | |
| | d2 = 3.500 | | |
| r3* = 302.871 | | | |
| | d3 = 1.800 | N2 = 1.52200 | ν2 = 52.20 |
| r4* = −39.780 | | | |
| | d4 = 1.500~3.907~1.412 | | |
| r5 = −20.000 | | | |
| | d5 = 0.800 | N3 = 1.63854 | ν3 = 55.45 |
| r6 = 10.669 | | | |
| | d6 = 0.800 | | |
| r7 = 12.450 | | | |
| | d7 = 1.550 | N4 = 1.84666 | ν4 = 23.78 |
| r8 = 48.662 | | | |
| | d8 = 10.824~3.774~1.000 | | |
| r9 = ∞(ST) | | | |
| | d9 = 0.600 | | |
| r10 = 11.059 | | | |
| | d10 = 1.807 | N5 = 1.77250 | ν5 = 49.77 |
| r11 = 137.002 | | | |
| | d11 = 0.100 | | |
| r12 = 7.339 | | | |
| | d12 = 2.800 | N6 = 1.75450 | ν6 = 51.57 |
| r13 = −37.431 | | | |
| | d13 = 0.010 | N7 = 1.51400 | ν7 = 42.83 |
| r14 = −37.431 | | | |
| | d14 = 0.712 | N8 = 1.84666 | ν8 = 23.78 |
| r15 = 6.744 | | | |
| | d15 = 1.282 | | |
| r16 = 9.773 | | | |
| | d16 = 1.500 | N9 = 1.52200 | ν9 = 52.20 |
| r17* = 33.228 | | | |
| | d17 = 1.112~7.313~12.854 | | |
| r18* = 22.508 | | | |
| | d18 = 1.000 | N10 = 1.58340 | ν10 = 30.23 |
| r19* = 8.706 | | | |
| | d19 = 0.773 | | |
| r20 = 53.706 | | | |
| | d20 = 1.801 | N11 = 1.78590 | ν11 = 43.93 |
| r21 = −10.576 | | | |
| | d21 = 2.530~0.971~0.700 | | |
| r22 = ∞ | | | |
| | d22 = 2.000 | N12 = 1.51680 | ν12 = 64.20 |
| r23 = ∞ | | | |

Aspherical Surface Data of Surface r3

$\epsilon = 1.0000$, $A4 = 0.28635 \times 10^{-3}$, $A6 = 0.15667 \times 10^{-4}$,
$A8 = -0.57168 \times 10^{-6}$
Aspherical Surface Data of Surface r4

$\epsilon = 1.0000$, $A4 = -0.17053 \times 10^{-3}$, $A6 = 0.80129 \times 10^{-5}$,
$A8 = -0.94476 \times 10^{-6}$
Aspherical Surface Data of Surface r17

$\epsilon = 1.0000$, $A4 = 0.14359 \times 10^{-2}$, $A6 = 0.19756 \times 10^{-4}$,
$A8 = 0.24320 \times 10^{-5}$
Aspherical Surface Data of Surface r18

$\epsilon = 1.0000$, $A4 = -0.14772 \times 10^{-2}$, $A6 = -0.28230 \times 10^{-4}$,
$A8 = 0.39925 \times 10^{-5}$
Aspherical Surface Data of Surface r19

$\epsilon = 1.0000$, $A4 = -0.12532 \times 10^{-2}$, $A6 = -0.15384 \times 10^{-4}$,
$A8 = 0.28984 \times 10^{-5}$

TABLE 4

Construction Data of Example 4
f = 4.45~7.8~12.7, FNO = 2.88~2.81~2.90,
2ω = 76.7~46~28.9

| Radius of Curvature | Axial Distance | Refractive Index | Abbe Number |
|---|---|---|---|
| r1 = 12.938 | | | |
| | d1 = 1.000 | N1 = 1.74330 | ν1 = 49.22 |
| r2 = 5.796 | | | |
| | d2 = 3.500 | | |
| r3* = 44.528 | | | |
| | d3 = 1.800 | N2 = 1.52200 | ν2 = 52.20 |
| r4* = −104.899 | | | |
| | d4 = 1.553~3.953~1.483 | | |
| r5 = −20.000 | | | |
| | d5 = 0.800 | N3 = 1.63854 | ν3 = 55.45 |
| r6 = 10.131 | | | |
| | d6 = 1.135 | | |
| r7 = 13.404 | | | |
| | d7 = 2.000 | N4 = 1.84666 | ν4 = 23.78 |
| r8 = 61.168 | | | |
| | d8 = 10.984~3.778~1.000 | | |
| r9 = ∞(ST) | | | |
| | d9 = 0.600 | | |
| r10 = 11.382 | | | |
| | d10 = 2.046 | N5 = 1.77250 | ν5 = 49.77 |
| r11 = −52.132 | | | |
| | d11 = 0.100 | | |
| r12 = 7.001 | | | |
| | d12 = 2.783 | N6 = 1.75450 | ν6 = 51.57 |
| r13 = −24.543 | | | |
| | d13 = 0.010 | N7 = 1.51400 | ν7 = 42.83 |
| r14 = −24.543 | | | |
| | d14 = 0.700 | N8 = 1.84666 | ν8 = 23.78 |
| r15 = 6.105 | | | |
| | d15 = 1.361 | | |
| r16* = −22.829 | | | |
| | d16 = 1.641 | N9 = 1.52200 | ν9 = 52.20 |
| r17* = −17.058 | | | |
| | d17 = 1.128~7.052~12.841 | | |
| r18* = −50.000 | | | |
| | d18 = 2.800 | N10 = 1.74330 | ν10 = 49.22 |
| r19 = −10.303 | | | |
| | d19 = 2.359~1.241~0.700 | | |
| r20 = ∞ | | | |
| | d20 = 2.000 | N11 = 1.51680 | ν11 = 64.20 |
| r21 = ∞ | | | |

Aspherical Surface Data of Surface r3

$\epsilon = 1.0000$, $A4 = 0.19527 \times 10^{-3}$, $A6 = 0.57342 \times 10^{-8}$,
$A8 = -0.20853 \times 10^{-6}$ Aspherical Surface Data of Surface r4

$\epsilon = 1.0000$, $A4 = -0.17096 \times 10^{-3}$, $A6 = -0.10072 \times 10^{-4}$,
$A8 = -0.10753 \times 10^{-6}$ Aspherical Surface Data of Surface r16

$\epsilon = 1.0000$, $A4 = -0.13142 \times 10^{-2}$, $A6 = 0.94352 \times 10^{-4}$,
$A8 = -0.12279 \times 10^{-5}$ Aspherical Surface Data of Surface r17

$\epsilon = 1.0000$, $A4 = 0.11300 \times 10^{-3}$, $A6 = 0.11926 \times 10^{-3}$,
$A8 = -0.60390 \times 10^{-7}$ Aspherical Surface Data of Surface r18

$\epsilon = 1.0000$, $A4 = -0.50806 \times 10^{-3}$, $A6 = 0.29779 \times 10^{-5}$,
$A8 = -0.38526 \times 10^{-7}$

TABLE 5

Construction Data of Example 5
f = 4.8~9.7~15.5, FNO = 2.83~2.85~3.01,
2ω = 72.6~36.8~23.5

| Radius of Curvature | Axial Distance | Refractive Index | Abbe Number |
|---|---|---|---|
| r1 = 11.104 | | | |
| | d1 = 0.800 | N1 = 1.74330 | ν1 = 49.22 |
| r2 = 6.378 | | | |
| | d2 = 2.300 | | |
| r3* = 14.802 | | | |
| | d3 = 1.800 | N2 = 1.52200 | ν2 = 52.20 |
| r4* = 20.396 | | | |
| | d4 = 2.430~5.010~4.866 | | |
| r5 = −20.000 | | | |
| | d5 = 0.800 | N3 = 1.63854 | ν3 = 55.45 |
| r6 = 9.907 | | | |
| | d6 = 0.800 | | |
| r7 = 10.952 | | | |
| | d7 = 1.500 | N4 = 1.84666 | ν4 = 23.78 |
| r8 = 27.854 | | | |
| | d8 = 11.584~3.183~1.000 | | |
| r9 = ∞(ST) | | | |
| | d9 = 0.600 | | |
| r10 = 16.003 | | | |
| | d10 = 1.787 | N5 = 1.77250 | ν5 = 49.77 |
| r11 = −34.803 | | | |
| | d11 = 0.100 | | |
| r12 = 6.218 | | | |
| | d12 = 2.784 | N6 = 1.75450 | ν6 = 51.57 |
| r13 = −93.239 | | | |
| | d13 = 0.010 | N7 = 1.51400 | ν7 = 42.83 |
| r14 = −93.241 | | | |
| | d14 = 0.700 | N8 = 1.84666 | ν8 = 23.78 |
| r15 = 5.710 | | | |
| | d15 = 1.002 | | |
| r16 = 11.201 | | | |
| | d16 = 1.500 | N9 = 1.52200 | ν9 = 52.20 |
| r17* = 16.808 | | | |
| | d17 = 1.180~7.784~13.237 | | |
| r18* = −50.000 | | | |
| | d18 = 1.000 | N10 = 1.58340 | ν10 = 30.23 |
| r19* = −55.066 | | | |
| | d19 = 0.515 | | |
| r20 = 37.772 | | | |
| | d20 = 1.500 | N11 = 1.78590 | ν11 = 43.93 |
| r21 = −20.359 | | | |
| | d21 = 1.609~0.825~0.700 | | |
| r22 = ∞ | | | |
| | d22 = 2.000 | N12 = 1.51680 | ν12 = 64.20 |
| r23 = ∞ | | | |

Aspherical Surface Data of Surface r3

$\epsilon = 1.0000$, $A4 = -0.68378 \times 10^{-4}$, $A6 = 0.91459 \times 10^{-5}$,
$A8 = -0.17059 \times 10^{-6}$ Aspherical Surface Data of Surface r4

$\epsilon = 1.0000$, $A4 = -0.30623 \times 10^{-3}$, $A6 = 0.77956 \times 10^{-5}$,
$A8 = -0.26508 \times 10^{-6}$ Aspherical Surface Data of Surface r17

$\epsilon = 1.0000$, $A4 = 0.15313 \times 10^{-2}$, $A6 = 0.48360 \times 10^{-4}$,
$A8 = 0.33469 \times 10^{-5}$ Aspherical Surface Data of Surface r18

$\epsilon = 1.0000$, $A4 = 0.33814 \times 10^{-2}$, $A6 = -0.12472 \times 10^{-3}$,
$A8 = 0.45839 \times 10^{-5}$ Aspherical Surface Data of Surface r19

$\epsilon = 1.0000$, $A4 = 0.39759 \times 10^{-2}$, $A6 = -0.12370 \times 10^{-3}$,
$A8 = 0.47201 \times 10^{-5}$

TABLE 6

Construction Data of Example 6
f = 3.0~5.2~8.6, FNO = 2.30~3.18~4.10,
2ω = 76.7~46.2~28.2

| Radius of Curvature | Axial Distance | Refractive Index | Abbe Number |
|---|---|---|---|
| r1 = 18.376 | | | |
| | d1 = 0.750 | N1 = 1.75450 | ν1 = 51.57 |
| r2 = 5.908 | | | |
| | d2 = 2.654~5.660~2.654 | | |
| r3* = −38.428 | | | |
| | d3 = 0.750 | N2 = 1.52510 | ν2 = 56.38 |
| r4* = 3.454 | | | |
| | d4 = 1.298 | | |
| r5 = 6.786 | | | |
| | d5 = 2.177 | N3 = 1.58340 | ν3 = 30.23 |
| r6 = −250.470 | | | |
| | d6 = 9.631~2.374~1.000 | | |
| r7 = ∞(ST) | | | |
| | d7 = 0.600 | | |
| r8 = 4.468 | | | |
| | d8 = 4.230 | N4 = 1.76822 | ν4 = 46.58 |
| r9 = −5.283 | | | |
| | d9 = 0.010 | N5 = 1.51400 | ν5 = 42.83 |
| r10 = −5.283 | | | |
| | d10 = 0.750 | N6 = 1.84666 | ν6 = 23.82 |
| r11* = 12.622 | | | |
| | d11 = 2.573~6.824~11.205 | | |
| r12 = −17.607 | | | |
| | d12 = 1.478 | N7 = 1.52510 | ν7 = 56.38 |
| r13* = −5.316 | | | |
| | d13 = 0.500 | | |
| r14 = ∞ | | | |
| | d14 = 3.400 | N8 = 1.51680 | ν8 = 64.20 |
| r15 = ∞ | | | |

Aspherical Surface Data of Surface r3

$\epsilon = 1.0000$, A4 = $-0.22743 \times 10^{-3}$, A6 = $0.81018 \times 10^{-4}$,
A8 = $-0.11992 \times 10^{-4}$
Aspherical Surface Data of Surface r4

$\epsilon = 1.0000$, A4 = $-0.34914 \times 10^{-2}$, A6 = $-0.12871 \times 10^{-3}$,
A8 = $-0.99555 \times 10^{-5}$
Aspherical Surface Data of Surface r11

$\epsilon = 1.0000$, A4 = $0.47689 \times 10^{-2}$, A6 = $0.18896 \times 10^{-3}$,
A8 = $0.77520 \times 10^{-4}$
Aspherical Surface Data of Surface r13

$\epsilon = 1.0000$, A4 = $0.26471 \times 10^{-2}$, A6 = $-0.51516 \times 10^{-4}$,
A8 = $0.18942 \times 10^{-5}$

TABLE 7

Construction Data of Example 7
f = 2.5~4.8~7.3, FNO = 2.37~3.33~4.10,
2ω = 72.9~40.4~26.7

| Radius of Curvature | Axial Distance | Refractive Index | Abbe Number |
|---|---|---|---|
| r1 = 16.241 | | | |
| | d1 = 0.800 | N1 = 1.75450 | ν1 = 51.57 |
| r2 = 5.499 | | | |
| | d2 = 3.085~5.394~3.085 | | |
| r3* = 23.072 | | | |
| | d3 = 1.000 | N2 = 1.52510 | ν2 = 56.38 |
| r4* = 3.156 | | | |
| | d4 = 1.390 | | |
| r5 = 5.079 | | | |
| | d5 = 1.653 | N3 = 1.84666 | ν3 = 23.82 |
| r6 = 7.886 | | | |
| | d6 = 9.655~3.023~1.879 | | |
| r7 = ∞(ST) | | | |
| | d7 = 0.600 | | |
| r8 = 4.268 | | | |
| | d8 = 3.824 | N4 = 1.73299 | ν4 = 52.32 |
| r9 = −5.710 | | | |
| | d9 = 0.010 | N5 = 1.51400 | ν5 = 42.83 |
| r10 = −5.710 | | | |
| | d10 = 0.750 | N6 = 1.84666 | ν6 = 23.82 |
| r11* = 27.698 | | | |
| | d11 = 1.576~5.899~9.351 | | |
| r12 = −12.089 | | | |
| | d12 = 2.546 | N7 = 1.52510 | ν7 = 56.38 |
| r13* = −4.510 | | | |
| | d13 = 0.500 | | |
| r14 = ∞ | | | |
| | d14 = 3.400 | N8 = 1.51680 | ν8 = 64.20 |
| r15 = ∞ | | | |

Aspherical Surface Data of Surface r3

$\epsilon = 1.0000$, A4 = $0.11334 \times 10^{-2}$, A6 = $0.83390 \times 10^{-4}$,
A8 = $-0.24186 \times 10^{-4}$
Aspherical Surface Data of Surface r4

$\epsilon = 1.0000$, A4 = $-0.14398 \times 10^{-2}$, A6 = $-0.68030 \times 10^{-4}$,
A8 = $-0.49071 \times 10^{-4}$
Aspherical Surface Data of Surface r11

$\epsilon = 1.0000$, A4 = $0.43753 \times 10^{-2}$, A6 = $0.23651 \times 10^{-3}$,
A8 = $0.47406 \times 10^{-4}$
Aspherical Surface Data of Surface r13

$\epsilon = 1.0000$, A4 = $0.35646 \times 10^{-2}$, A6 = $-0.42883 \times 10^{-4}$,
A8 = $0.14875 \times 10^{-5}$

TABLE 8

Construction Data of Example 8
f = 1.6~3.0~4.6, FNO = 2.44~3.37~4.10,
2ω = 76.4~43.8~28.8

| Radius of Curvature | Axial Distance | Refractive Index | Abbe Number |
|---|---|---|---|
| r1 = 7.967 | | | |
| | d1 = 0.800 | N1 = 1.75450 | ν1 = 51.57 |
| r2 = 3.205 | | | |
| | d2 = 2.923~4.841~3.019 | | |
| r3* = 14.015 | | | |
| | d3 = 1.000 | N2 = 1.52510 | ν2 = 56.38 |
| r4* = 2.338 | | | |
| | d4 = 2.084 | | |
| r5 = 5.334 | | | |
| | d5 = 3.470 | N3 = 1.84666 | ν3 = 23.82 |
| r6 = 8.028 | | | |
| | d6 = 7.717~2.047~1.000 | | |
| r7 = ∞(ST) | | | |
| | d7 = 0.600 | | |
| r8 = 4.296 | | | |
| | d8 = 3.644 | N4 = 1.76050 | ν4 = 50.55 |
| r9 = −4.200 | | | |
| | d9 = 0.010 | N5 = 1.51400 | ν5 = 42.83 |
| r10 = −4.200 | | | |
| | d10 = 0.750 | N6 = 1.84666 | ν6 = 23.82 |
| r11* = −159.225 | | | |
| | d11 = 0.897~4.648~7.518 | | |
| r12 = −8.166 | | | |
| | d12 = 2.207 | N7 = 1.52510 | ν7 = 56.38 |
| r13* = −3.963 | | | |
| | d13 = 0.500 | | |
| r14 = ∞ | | | |
| | d14 = 3.400 | N8 = 1.51680 | ν8 = 64.20 |
| r15 = ∞ | | | |

TABLE 8-continued

Construction Data of Example 8
f = 1.6~3.0~4.6, FNO = 2.44~3.37~4.10,
2ω = 76.4~43.8~28.8

Aspherical Surface Data of Surface r3

$\epsilon = 1.0000$, $A4 = 0.19149 \times 10^{-2}$, $A6 = 0.14015 \times 10^{-2}$,
$A8 = -0.37347 \times 10^{-3}$, $A10 = 0.31010 \times 10^{-4}$
Aspherical Surface Data of Surface r4

$\epsilon = 1.0000$, $A4 = -0.67645 \times 10^{-2}$, $A6 = -0.60143 \times 10^{-4}$,
$A8 = -0.46412 \times 10^{-3}$
Aspherical Surface Data of Surface r11

$\epsilon = 1.0000$, $A4 = 0.37565 \times 10^{-2}$, $A6 = 0.66871 \times 10^{-3}$,
$A8 = -0.80434 \times 10^{-4}$
Aspherical Surface Data of Surface r13

$\epsilon = 1.0000$, $A4 = 0.52954 \times 10^{-2}$, $A6 = -0.75580 \times 10^{-3}$,
$A8 = 0.15734 \times 10^{-3}$

TABLE 9

Construction Data of Example 9
f = 4.5~7.8~12.7, FNO = 3.24~3.09~4.13,
2ω = 76.4~47.9~29.6

| Radius of Curvature | Axial Distance | Refractive Index | Abbe Number |
|---|---|---|---|
| r1 = 21.240 | | | |
| | d1 = 1.200 | N1 = 1.75450 | ν1 = 51.57 |
| r2 = 5.872 | | | |
| | d2 = 3.000~8.500~4.979 | | |
| r3* = 8.946 | | | |
| | d3 = 1.000 | N2 = 1.62112 | ν2 = 57.62 |
| r4* = 4.431 | | | |
| | d4 = 2.156 | | |
| r5 = 7.067 | | | |
| | d5 = 2.000 | N3 = 1.84666 | ν3 = 23.82 |
| r6 = 9.677 | | | |
| | d6 = 11.453~2.003~1.000 | | |
| r7 = ∞(ST) | | | |
| | d7 = 0.600 | | |
| r8* = 5.559 | | | |
| | d8 = 1.675 | N4 = 1.57965 | ν4 = 60.49 |
| r9 = 13.046 | | | |
| | d9 = 0.100 | | |
| r10 = 6.192 | | | |
| | d10 = 2.500 | N5 = 1.48749 | ν5 = 70.44 |
| r11 = −11.918 | | | |
| | d11 = 0.203 | | |
| r12 = −14.208 | | | |
| | d12 = 3.421 | N6 = 1.79850 | ν6 = 22.60 |
| r13* = 21.481 | | | |
| | d13 = 0.780 | | |
| r14 = 14.579 | | | |
| | d14 = 4.000 | N7 = 1.75450 | ν7 = 51.57 |
| r15* = 12.388 | | | |
| | d15 = 1.898~5.848~10.372 | | |
| r16 = ∞ | | | |
| | d16 = 2.000 | N8 = 1.51680 | ν8 = 64.20 |
| r17 = ∞ | | | |

Aspherical Surface Data of Surface r3

$\epsilon = 1.0000$, $A4 = 0.13577 \times 10^{-2}$, $A6 = -0.10949 \times 10^{-3}$,
$A8 = 0.37797 \times 10^{-5}$
Aspherical Surface Data of Surface r4

$\epsilon = 1.0000$, $A4 = 0.65141 \times 10^{-3}$, $A6 = -0.18413 \times 10^{-3}$,
$A8 = 0.34984 \times 10^{-5}$
Aspherical Surface Data of Surface r8

$\epsilon = 1.0000$, $A4 = -0.30607 \times 10^{-3}$, $A6 = -0.12679 \times 10^{-4}$,
$A8 = -0.66500 \times 10^{-6}$
Aspherical Surface Data of Surface r13

$\epsilon = 1.0000$, $A4 = 0.28699 \times 10^{-2}$, $A6 = 0.29442 \times 10^{-5}$,
$A8 = 0.14242 \times 10^{-4}$
Aspherical Surface Data of Surface r15

$\epsilon = 1.0000$, $A4 = -0.73341 \times 10^{-3}$, $A6 = 0.14643 \times 10^{-3}$,
$A8 = -0.36100 \times 10^{-5}$

TABLE 10

Actual Values of Conditional Formulae

| Ex. | (1) f1/f2 | (2) \|f12/fw\| | (3) (tanωw)² · fw/TLw | (4) TLw□Fnt/ (fw · tanωw) | (5) Y = 0.7 Ymax (\|X\| − \|X0\|)/ [C0(N' − N)f3] | (6) (CR1 − CR2)/ (CR1 + CR2) | (7) \|f12/f3\| |
|---|---|---|---|---|---|---|---|
| 1 | 2.620 | 2.482 | 0.065 | 34.43 | −0.267 | 0.676 | 1.024 |
| 2 | 1.434 | 2.416 | 0.068 | 33.65 | −0.094 | — | 1.042 |
| 3 | 1.426 | 2.140 | 0.068 | 33.71 | −0.199 | — | 0.974 |
| 4 | 1.131 | 2.270 | 0.067 | 34.19 | −0.023 | 0.658 | 1.017 |
| 5 | 0.773 | 2.315 | 0.066 | 33.59 | −0.091 | — | 1.203 |
| 6 | 1.443 | 2.268 | 0.059 | 55.29 | −0.033 | 0.054 | 0.873 |
| 7 | 1.337 | 2.260 | 0.043 | 69.95 | −0.090 | 0.457 | 0.817 |
| 8 | 1.269 | 2.206 | 0.032 | 101.59 | −0.069 | 0.347 | 0.590 |
| 9 | 3.909 | 1.812 | 0.071 | 46.08 | 0.002 | — | 1.023 |

What is claimed is:

1. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power, a second lens unit having a negative optical power, and a third lens unit having a positive optical power;

wherein the third lens unit has an aspherical surface at the image side thereof; and wherein the following conditional formulae are fulfilled:

$$-0.6 < (|X|-|X0|)/[C0 \cdot (N'-N) \cdot f3] < 0$$

$$0.1 Ymax \leq Y \leq 0.7 Ymax$$

wherein
X represents a surface shape of the aspherical surface;
X0 represents a surface shape of a reference spherical surface of the aspherical surface;
C0 represents a curvature of the reference spherical surface of the aspherical surface;
N represents a refractive index for a d-line of the object-side medium of the aspherical surface;
N' represents the refractive index for the d-line of the image-side medium of the aspherical surface;
f3 represents a focal length of the third lens unit;
Ymax represents a maximum effective optical path of an aspherical surface; and
Y represents a height in a direction perpendicular to an optical axis.

2. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power and provided at the most object side of the zoom lens system, a second lens unit having a negative optical power, and a third lens unit having a positive optical power, and wherein the following conditional formula is fulfilled:

$$0.5 < f1/f2 < 5$$

wherein
f1 represents a focal length of the first lens unit; and
f2 represents a focal length of the second lens unit.

3. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power, a second lens unit having a negative optical power, and a third lens unit having a positive optical power; and wherein the following conditional formulae are fulfilled:

$$1.5 < |f12/fw| < 4$$

$$0.058 < (\tan \omega w)^2 \times fw/TLw < 0.9$$

wherein
f12 represents a composite focal length of the first and the second lens units at a wide-angle end;
tan ωw represents a half view angle at a wide-angle end;
fw represents a focal length of an entire optical system at the wide-angle end; and
TLw represents a distance from a first vertex to an image plane at the wide-angle end.

4. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power, a second lens unit having a negative optical power, and a third lens unit having a positive optical power; and wherein the following conditional formulae is fulfilled:

$$1.5 < |f12/fw| < 4$$

$$10 < TLw \times Fnt/(fw \times \tan \omega w) < 50$$

where
TLw represents a distance from a first vertex to an image plane at a wide-angle end;
Fnt represents an f-number at a telephoto end;
f12 represents a composite focal length of the first and the second lens units at the wide-angle end;
fw represents a focal length of an entire optical system at the wide-angle end; and
tan ωw represents a half view angle at the wide-angle end.

5. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power and provided at the most object side of the zoom lens system, a second lens unit having a negative optical power, and a third lens unit having a positive optical power, and wherein the lens unit closest to the image side has a positive optical power, said lens unit is comprised of at least one positive lens element and the positive lens element fulfills the following conditional formula:

$$0.05 < (CR1-CR2)/(CR1+CR2) < 5$$

wherein
CR1 represents a radius of curvature of the object-side surface; and
CR2 represents a radius of curvature of the image-side surface.

6. An optical device comprising:
a zoom lens system, comprising a plurality of lens units, which achieves zooming by varying unit-to-unit distances; and
an image sensor for converting an optical image formed by the zoom lens system into an electrical signal,
wherein the zoom lens system comprises at least, from an object side thereof to an image side thereof, a first lens unit having a negative optical power, a second lens unit having a negative optical power, and a third lens unit having a positive optical power; and
wherein the following conditional formula is fulfilled:

$$04<|f12/f3|<1.5$$

where
f12 represents a composite focal length of the first and the second lens units at a wide-angle end; and
f3 represents a focal length of the third lens unit.

7. An optical device comprising:
a zoom lens system, comprising a plurality of lens units, which achieves zooming by varying unit-to-unit distances; and
an image sensor for converting an optical image formed by the zoom lens system into an electrical signal,
wherein the zoom lens system comprises at least, from an object side thereof to an image side thereof, a first lens unit having a negative optical power and provided at the most object side of the zoom lens system, a second lens unit having a negative optical power, a third lens unit having a positive optical power, and a fourth lens unit having a positive optical power; and
wherein said first lens unit through said fourth lens unit are disposed sequentially across a variable air gap.

8. An optical device as claimed in claim 7 wherein the zoom lens system achieves zooming by varying distances between the first lens unit to the fourth lens unit.

9. An optical device as claimed in claim 8 wherein the zoom lens system further comprises a low-pass filter which adjusts spatial frequency characteristics of the optical image formed by the zoom lens system, said low-pass filter located between the first lens unit and the image sensor.

10. An optical device as claimed in claim 9 wherein the first lens unit and the low-pass filter remain stationary during zooming.

11. An optical device comprising:
a zoom lens system, comprising a plurality of lens units, which achieves zooming by varying unit-to-unit distances; and
an image sensor for converting an optical image formed by the zoom lens system into an electrical signal,
wherein the zoom lens system comprises at least, from an object side thereof to an image side thereof, a first lens unit having a negative optical power and being provided at the most object side of the zoom lens system, a second lens unit having a negative optical power, a third lens unit having a positive optical power, and a fourth lens unit having a positive optical power; and
wherein the first lens unit is a single lens element.

12. An optical device as claimed in claim 7 wherein the first lens unit comprises two lens elements.

13. An optical device as claimed in claim 7 wherein the third lens unit comprises at least two positive lens elements and at least one negative lens element.

14. An optical device as claimed in claim 7 wherein the third lens unit has an aspherical surface at the image side thereof.

15. An optical device comprising:
a zoom lens system, comprising a plurality of lens units, which achieves zooming by varying unit-to-unit distances; and
an image sensor for converting an optical image formed by the zoom lens system into an electrical signal,
wherein the zoom lens system comprises at least, from an object side thereof to an image side thereof, a first lens unit having a negative optical power, a second lens unit having a negative optical power, a third lens unit having a positive optical power, and a fourth lens unit having a positive optical power;
wherein the third lens unit has an aspherical surface at the image side thereof; and
wherein the following conditional formulae is fulfilled:

$$-0.6<(|X|-|X0|)/[C0 \cdot (N'-N) \cdot f3]<0$$

$$0.1Ymax \leq Y \leq 0.7Ymax$$

wherein
X represents a surface shape of the aspherical surface;
X0 represents a surface shape of a reference spherical surface of the aspherical surface;
C0 represents a curvature of the reference spherical surface of the aspherical surface;
N represents a refractive index for a d-line of the object-side medium of the aspherical surface;
N' represents the refractive index for the d-line of the image-side medium of the aspherical surface;
f3 represents a focal length of the third lens unit;
Ymax represents a maximum effective optical path of an aspherical surface; and
Y represents a height in a direction perpendicular to an optical axis.

16. An optical device as claimed in claim 7 wherein the following conditional formula is fulfilled:

$$0.5<f1/f2<5$$

wherein
f1 represents a focal length of the first lens unit; and
f2 represents a focal length of the second lens unit.

17. An optical device comprising:
a zoom lens system, comprising a plurality of lens units, which achieves zooming by varying unit-to-unit distances; and
an image sensor for converting an optical image formed by the zoom lens system into an electrical signal,
wherein the zoom lens system comprises at least, from an object side thereof to an image side thereof, a first lens unit having a negative optical power, a second lens unit having a negative optical power, a third lens unit having a positive optical power, and a fourth lens unit having a positive optical power; and
wherein the following conditional formulae are fulfilled:

$$1.5<|f12/fw|<4$$

$$0.058<(\tan \omega w)2 \times fw/TLw<0.9$$

wherein
f12 represents a composite focal length of the first and the second lens units at a wide-angle end;
tan ωw represents a half view angle at a wide-angle end;

fw represents a focal length of an entire optical system at the wide-angle end; and TLw represents a distance from a first vertex to an image plane at the wide-angle end.

18. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power, a second lens unit having a negative optical power, a third lens unit having a positive optical power, and a fourth lens unit having a positive optical power; and wherein the following conditional formulae is fulfilled:

$$1.5 < |f12/fw| < 4$$

$$10 < TLw \times Fnt/(fw \times \tan \omega w) < 50$$

where

TLw represents a distance from a first vertex to an image plane at a wide angle end;

Fnt represents an f-number at a telephoto end;

f12 represents a composite focal length of the first and the second lens units at the wide-angle end;

fw represents a focal length of an entire optical system at the wide-angle end; and tan ωw represents a half view angle at the wide-angle end.

19. An optical device as claimed in claim 7 wherein the lens unit closest to the image side has a positive optical power, said lens unit is comprised of at least one positive lens element and the positive lens element fulfills the following conditional formula:

$$0.05 < (CR1-CR2)/(CR1+CR2) < 5$$

wherein

CR1 represents a radius of curvature of the object-side surface; and

CR2 represents a radius of curvature of the image-side surface.

20. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power, a second lens unit having a negative optical power, a third lens unit having a positive optical power, and a fourth lens unit having a positive optical power; and wherein the following conditional formula is fulfilled:

$$0.4 < |f12/f3| < 1.5$$

where f12 represents a composite focal length of the first and the second lens units at a wide-angle end; and f3 represents a focal length of the third lens unit.

* * * * *

UNITED STATES PATENT AND TRADEMARK OFFICE
CERTIFICATE OF CORRECTION

PATENT NO. : 6,721,106 B2
DATED : April 13, 2004
INVENTOR(S) : Yasushi Yamamoto et al.

It is certified that error appears in the above-identified patent and that said Letters Patent is hereby corrected as shown below:

Column 10,
Line 61, delete "f=4.45~7  8~12.7", and insert -- f=4.45~7.8~12.7 --.

Column 11,
Line 4, delete "f=4.45~7  8~12.7", and insert -- f=4.45~7.8~12.7 --.

Column 12,
Line 40, delete "r20 = 53 706", and insert -- r20 = 53.706 --.
Line 60, delete "A6= –0 28230×10$^{-4}$", and insert -- A6= –0.28230×10$^{-4}$ --.

Column 14,
Line 14, delete "d4 = 2.430~5.010~4.866", and insert -- d4 = 2.430~5.010~1.866 --.

Column 16,
Line 21, delete "A4  0.11334×10$^{-2}$", and insert -- A4 = 0.11334×10$^{-2}$ --.
Line 22, delete "A8= – 0  24186×10$^{-4}$", and insert -- A8= – 0.24186×10$^{-4}$ --.

Column 21,
Line 34, after "gap", delete ".", and insert -- with no intervening lenses. --.

Signed and Sealed this

Twenty-fifth Day of April, 2006

JON W. DUDAS
*Director of the United States Patent and Trademark Office*